United States Patent
Seal

(10) Patent No.: US 9,513,055 B1
(45) Date of Patent: Dec. 6, 2016

(54) SYSTEMS AND METHODS FOR CHANGING THE CHEMISTRY IN HEAPS, PILES, DUMPS AND COMPONENTS

(71) Applicant: Differential Engineering Inc., Spring Creek, NV (US)

(72) Inventor: Thomas Joseph Seal, Spring Creek, NV (US)

(73) Assignee: DIFFERENTIAL ENGINEERING INC., Spring Creek, NV (US)

( * ) Notice: Subject to any disclaimer, the term of this patent is extended or adjusted under 35 U.S.C. 154(b) by 112 days.

(21) Appl. No.: 14/279,240

(22) Filed: May 15, 2014

Related U.S. Application Data

(63) Continuation-in-part of application No. 13/460,529, filed on Apr. 30, 2012, now Pat. No. 9,050,545.

(60) Provisional application No. 61/479,850, filed on Apr. 28, 2011.

(51) Int. Cl.
| | |
|---|---|
| *C22B 7/00* | (2006.01) |
| *B01D 11/02* | (2006.01) |
| *E21B 43/28* | (2006.01) |
| *F26B 19/00* | (2006.01) |
| *F26B 9/10* | (2006.01) |

(52) U.S. Cl.
CPC ............ *F26B 19/00* (2013.01); *B01D 11/02* (2013.01); *B01D 11/0223* (2013.01); *C22B 7/006* (2013.01); *E21B 43/28* (2013.01); *F26B 9/10* (2013.01)

(58) Field of Classification Search
CPC ..... B01D 11/02; B01D 11/0223; C22B 7/006; E21D 43/28; E21B 43/28
See application file for complete search history.

(56) References Cited

U.S. PATENT DOCUMENTS

| | | |
|---|---|---|
| 4,589,488 A | 5/1986 | Schirmer |
| 8,021,461 B2 | 9/2011 | Seal |
| 2008/0042446 A1* | 2/2008 | Kurtz ............. B60L 8/00 290/55 |

FOREIGN PATENT DOCUMENTS

| | | | |
|---|---|---|---|
| CA | 2423101 A1 * | 9/2004 | ............. F03D 9/001 |

* cited by examiner

*Primary Examiner* — George Wyszomierski
*Assistant Examiner* — Tima M McGuthry Banks
(74) *Attorney, Agent, or Firm* — Baker & Hostetler LLP

(57) ABSTRACT

A system for changing the properties of materials in a pile including a power section, an air movement, and a downwell section installed into a well of the pile that includes a drill casing having one or more perforated casing sections, a pipe/hose having a perforated section aligned with the one or more perforated casing sections, and an isolation mechanism configured to seal the drill casing above and below the perforated section so as to isolate the flow of air through the perforated section. The system dries an impacted zone when air is pumped into the downwell section through the perforated section of the pipe/hose into the pile. The system removes moistures from the pile when air is pulled from the pile into the downwell section through the perforated section of the pipe/hose.

20 Claims, 14 Drawing Sheets

SYSTEMS AND METHODS FOR CHANGING THE CHEMISTRY IN HEAPS, PILES, DUMPS AND COMPONENTS

CROSS REFERENCE TO RELATED APPLICATIONS

This application is a continuation-in-part of U.S. patent application Ser. No. 13/460,529, filed 30 Apr. 2012, now U.S. Pat. No. 9,050,545, which claims a benefit under 35 U.S.C. §119(e) to U.S. Provisional Patent Application No. 61/479,850, filed 28 Apr. 2011, which are incorporated herein by reference.

TECHNICAL FIELD

The present disclosure relates to the treatment and processing of heaps, piles, dumps and the components thereof.

BACKGROUND

A common technique for stacking ores, other minerals and solid waste materials is to pile the material. An engineered or un-engineered pile of fragmented, un-consolidated rock, clay, gravel, solid waste or material removed or mined from the earth, of particulate material is constructed, typically over an engineered liner and liquid collection system. Older piles typically have no engineered liner or solution collection system. Natural precipitation or meteoric water is naturally applied to and percolated through the pile depending on local weather conditions, where the water contacts the material and may change the material's chemistry. The water may dissolve one or more elements, compounds or minerals that may degrade the quality of the water solution that flows from the pile, either to a collection system or to the earth adjacent to or underneath the pile. Depending on the previous reagents added to the pile and the material and mineral composition of the pile, the solution flowing from a pile may have high or low pH and may contain harmful or hazardous elements, compounds and mixtures that may impact local and regional water quality. Soil and other covers are sometimes applied on the surface of the pile to reduce or control the meteoric water with dissolved or entrained gases that flows through a pile.

Theoretically, the meteoric solution (rain or snow fall) is supposed to travel vertically through the pile in a fairly uniform manner from the starting point of each rain drop, drip point or snow melt drip. In reality, within a relatively short period of time, a path of least resistance will be formed in the pile starting at each drip point that is based on the formation or placement of the material underneath the drip point. Each path of least resistance is unlikely to be completely vertical and as a result, large sections of the pile may receive no meteoric solution initially, resulting in relatively little or no chemical changes of the piled material. Also, the chemical properties in some portions of the pile may be less conducive and reactive to the meteoric solution to the dissolution of the minerals, compounds and mixtures into the discharge solution flowing from the pile. But, after a period of time, due to capillary action and changes in the meteoric solution flow pathways, plus time dependent chemical and biochemical reactions, the chemistry of the meteoric solution can be altered. In addition, colonies of aerobic and anaerobic bacteria naturally inoculated during the placement of the pile may influence this reaction of the meteoric solution with the material in the pile. These colonies of bacteria respond differently to the chemistry of the solution that impacts their local environment. Thus, the pH, quantity of dissolved gases, chemical composition of the solution and other reagents and minerals, naturally occurring and added to the material upstream of the local environment, will dictate the local zone's chemistry and biochemistry.

Generally, a modern pile has a collection system or drainage or is located where the solution flowing from a pile is collected, quantified and may be sampled. Historic piles may not have a collection system or may have a partial one, one that leaks or is inadequate. Water quality of the solution flowing from a pile may dictate the need for treatment to clean up, remove or alter certain hazardous or toxic components found in the water so the water quality can approach the characteristics outlined by the "Clean Water Act." Solutions are needed that will allow the physical rechanneling of solution pathways through a pile, so fluids in a pile (post stimulation) will gravitate to a downhole well, then to the bottom of a pile, thus reducing the solution retention contact with minerals and retention time in the pile.

U.S. Pat. No. 8,021,461, which is incorporated herein by reference, is directed to improving the extraction of components of interest from heaps, particularly when non-uniform leaching occurs, and involves remedial treatment of a selected portion or portions of the heap.

SUMMARY

Embodiments relate to systems and methods for treatment of dumps, heaps, piles, stockpiles, plus stacked rock, solid waste and earth materials, and more particularly, to the remedial treatment of these dumps, heaps, piles, and stockpiles to change the chemistry in these piles such that solution that flows from such piles is more environmental benign and or the volume of solution flow is reduced or eliminated. All dumps, heaps, piles, stockpiles, plus stacked rock and earth or solid waste materials will be referred to herein as "piles."

In embodiments, wells with perforated well casing are installed into the pile to be treated. Each designed perforation of the well casing is called a "zone" that during stimulation (pumping or compressing a fluid) impacts a geometric volume of the pile, depending on the pump or compressor pressure, volume and location of the zone isolation mechanism.

In embodiments, a fluid containing the treatment and/or other chemicals and/or reagents may be delivered into the well through one or more conduits or pipes. The fluid or carrying fluid or parent fluid may be organic, inorganic, water based, slurry (fluid and solids), organic based, gas based or any combination that is pumpable or a compressible fluid that can flow through a pipe or conduit. The chemicals in the fluid may further be mixed together and/or with other ingredients that are pumpable or compressible. All pumpable or compressible solutions, slurry, gases or combinations thereof be will be referred to as fluids in this document. The fluid may thereafter be screened and delivered, for example by being pumped or pressurized by a compressor, or other mechanical devices, to pressures required for delivery of the fluid through a perforated well, deep into a pile to treat, alter the chemistry, and/or alter the local environment of a zone to change the chemistry or moisture of such a zone. The delivery method may open or stimulate new fluid pathways or channels by moving the particles in the pile, thereby creating new channels, and allowing fluid to interface with the pile's material. The material in the pile has been fractured when mined, or generated as solid waste so the process does not use hydraulic fracturing of the material, but relies upon pressurized fluid rechanneling or stimulation through the pile. The system may include a mobile apparatus (e.g., a mobile trailer) assembled near or at the vicinity of the injection well or off the pile.

The trailer apparatus may comprise instruments configured to perform a number of functions including, but not limited to, measurement of flow and pressure of a treatment fluid and addition of other fluids. The trailer may further comprise a high pressure, low volume compressor to inflate a straddle zone isolation mechanism to isolate a specific elevation, or zone in the pile for selective stimulation, or the whole well for, chemical treatment and chemical, biological and physical property treatment or alteration. Embodiments enable any one or more of higher flow rates, higher pressure, and delivery to increased depths, while maintaining and/or enhancing safer operations. Pressurization of the straddle zone isolation mechanism may be achieved without the use of pressurized gas bottles.

Post stimulation or treatment, the system may include an apparatus (e.g. a solar-wind, green energy mechanism) assembled near or on top of the injection well to circulate fluid, gas or air up and down the injection well to impart additional chemical, biological or physical changes (hydrate or dehydrate) to a zone or zones in the pile. The injection well or selective zones in a well may undergo a series of stimulations and treatments followed by a series of fluid treatments to continue the change in the chemistry and physical properties of the treated zone and adjacent portions of the pile.

BRIEF DESCRIPTION OF THE DRAWINGS

The present disclosure is illustrated by way of non-limiting and non-exhaustive example, and not by way of limitation, in the figures of the accompanying drawings, in which like reference numerals refer to similar elements.

DETAILED DESCRIPTION OF ILLUSTRATIVE EMBODIMENTS

Figure 1:
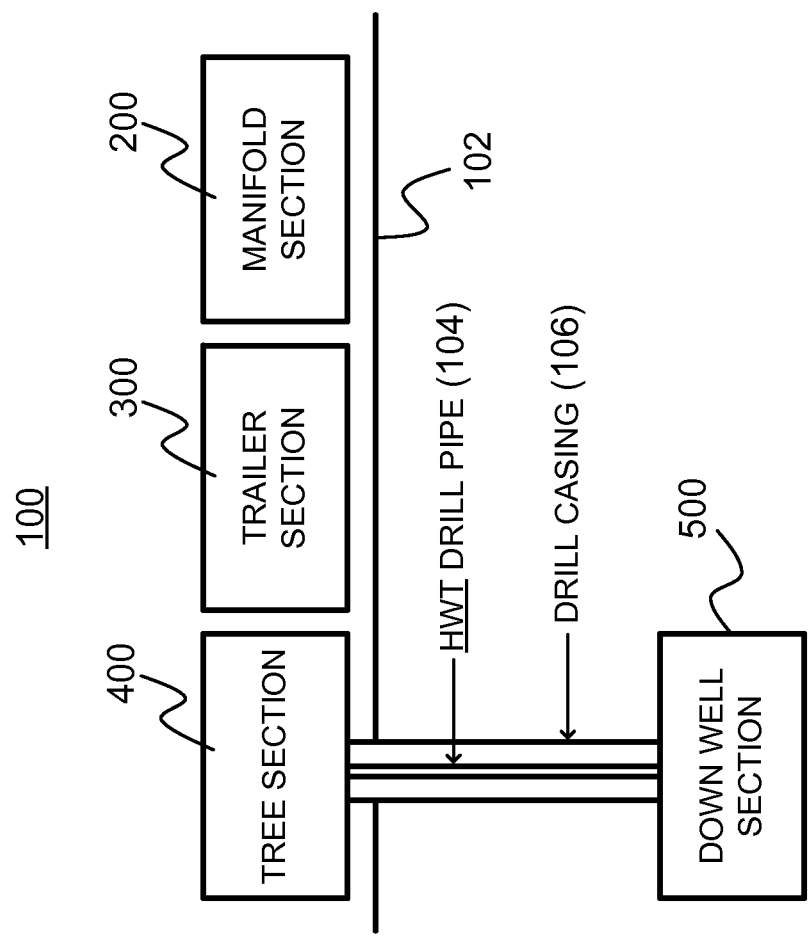
FIG. 1 is a block diagram of an embodiment involving a system for changing the chemistry or physical properties of a pile using pumpable or compressible fluids.

Adding specific reagents, chemicals, dissolved or un-dissolved gases, liquids, solutions, solids, slurry, bacteria, and other dissolved or un-dissolved compounds in a collective entrained mixture of solids, liquids and gasses, thus in a pumpable or compressed "fluid" to a targeted zone or a well, can alter the chemistry and biochemistry in the local in situ pile environment. The reagents, chemicals, dissolved gasses, bacterial and other compounds can be solid, liquid or a gas or mixture thereof, plus cultures of bacteria. These reagents can be organic, inorganic or biological or combinations thereof. The present disclosure does not specify the particular reagents that could or should be used in a delivery system, but rather discloses a delivery system that may be utilized for any such reagents, chemicals, gasses, bacteria, etc., collectively referenced herein as a "fluid" whether liquid or gaseous, into a target zone of a pile. The present disclosure is directed to treating the pile in situ, or at the location or zone of the chemical and biological changes within the pile, and is not directed to treatment of the solution after flowing from the pile. The systems and methods of the present disclosure can alter the chemistry and biology of a zone of a pile for varying lengths of time, from short to permanent, depending on the zone's environment and the composition and quantity of fluid added. Multiple treatments may be utilized until the desired zonal environment is permanently altered to reduce the quantity of solution flow and to improve the quality of solution flowing from the pile.

In the process of adding fluids to a pile, additional materials can be added to the pile, such as tailings, that can perform different functions, such as preventing certain hazardous materials from entering the solution flowing from the pile. For example: stable salts of mercury, arsenic, antimony cadmium, or other inorganic salts and/or sulfide producing anaerobic bacteria may be added to the fluid to stabilize compounds in the pile and to cause those compounds to be stored in void space in a lined pile. Mill tailings can also be injected into a heap or a lined pile to fill the void spaces with the fine ground material with or without hazardous materials. Compatible chemistry of the pile and the stimulation chemical fluids and compounds are required for long term storage. In addition, if the storage compounds become valuable in the future, the wells will allow access for additional reagents and lixiviants to be introduced to the pile to dissolve the stored compounds for potential future recovery.

Upon completion of a treatment with fluids, the material in the pile may be opened up with new channels and improved internal porosity. The well head may then be fitted with an apparatus and down hole conduit to capture outside ambient air and force the air down into the pile or to be pulled through the well to dry the impacted zone and remove in situ gases and water vapor. Heaps and piles act like a large sponge. Present embodiments will capture the waste environmental energy in the form of solar and wind to power the apparatus installed on the well head in a green manner. Engineering principles dictate that gases and water vapor only diffuse about 2 meters into or out of a heap or pile (depending on particle size, compaction, etc.), unless an outside source of energy is applied. Heaps and piles achieve a drain down moisture or water content naturally when external solution application flows cease. Thus, meteoric water added to a heap or pile will flow out of a pile in time, and the pile will maintain the internal moisture equilibrium content. Most meteoric water events are seasonal. Wet seasons mixed with dry seasons have a local pan evaporation value that measures the net gain or loss of water in a time period due to evaporation. Areas of high negative pan evaporation or a lot of seasonal evaporation and low humidity can use this technology to dry the interior of the pile. When a pile loses more water in the dry season than it gains during the wet season by using this technology, the solution in the pile will be reduced resulting in a reduction or elimination of the solution able to flow from the pile. Thus, meteoric water will flow into the created internal dry zones in a pile and reestablish the drain down moisture before allowing solution to flow down to another zone below. Using this green technology to dry the pile's interior, as properly designed and installed, will reduce and or eliminate the solution flowing from a pile over time. Present embodiments will also reduce the need for covers on piles and heaps to reduce the meteoric water quantity.

Fluids added to and flowing from the pile can be monitored using scientific instruments and testing such as, but not limited to: flow meters, pressure gauges, temperature, humidity, chemical analysis, etc. Local and regional environmental factors can also be measured, but not limited, to determine the changes in the fluids flowing from the pile, like temperature, humidity, wind speed, wind direction, pan evaporation, rainfall, sunlight intensity and duration, and chemical analysis, etc. Additional parameters can be measured on the mechanical aspects of the apparatus, but not limited to, revolutions per minute, fuel or energy usage, operational time, efficiency, availability, etc. All of these measurements may be recorded and stored electronically, remotely and/or on site using standard instrument technology.

Embodiments may be used for mine closure and reclamation of piles, reducing or eliminating acid rock drainage from piles, and other applications that require changing the chemistry internally in a pile.

Embodiments will now be described in detail with reference to accompanying drawings. In the following description, numerous specific details are set forth in order to provide a thorough understanding of the present disclosure. It will be apparent, however, to one skilled in the art, that the present disclosure may be practiced without some or all of these specific details. In other instances, well known process steps and/or structures may not be described in detail in order to not unnecessarily obscure the present disclosure.

Although the terms "heap", "dump", "stockpile", "waste pile" and "pile" may be used herein to illustrate an application of the systems and methods described herein, embodiments are limited to use with stacked, dumped, placed, mined material or solid waste. The systems and methods herein may also be used for any mined material, rock, clay, shale, granite, coal, igneous, sedimentary or metamorphic rock or solid waste material that is placed on or over un-mined material, a prepared base, an engineered liner with a collection system, which are collectively referred to herein as a "pile," regardless of the design of the pile, collection system pipe work, ditches, ponds, liner, drain rock or lack of, and regardless of whether such collections include other materials.

Referring to FIG. 1, an embodiment of a system 100 and an accompanying method for changing the chemical, biological, and physical properties of one or more properties of interest in a pile 102 are illustrated. As shown in FIG. 1, an exemplary system may include five main sections: a manifold section 200, a trailer section 300, a tree section 400, a down well section 500, and the pipe 104 and casing 106 between the tree section 400 and down well section 500. While the trailer section 300 is referred to herein as a trailer section, it is to be understood that any type of mobile or stationary platform could be used in place of the flatbed style of trailer illustrated herein whether on, near, adjacent or upstream of the pile 102. While each of these sections will be described in greater detail below, each section may not be described in this precise order.

Figure 2:
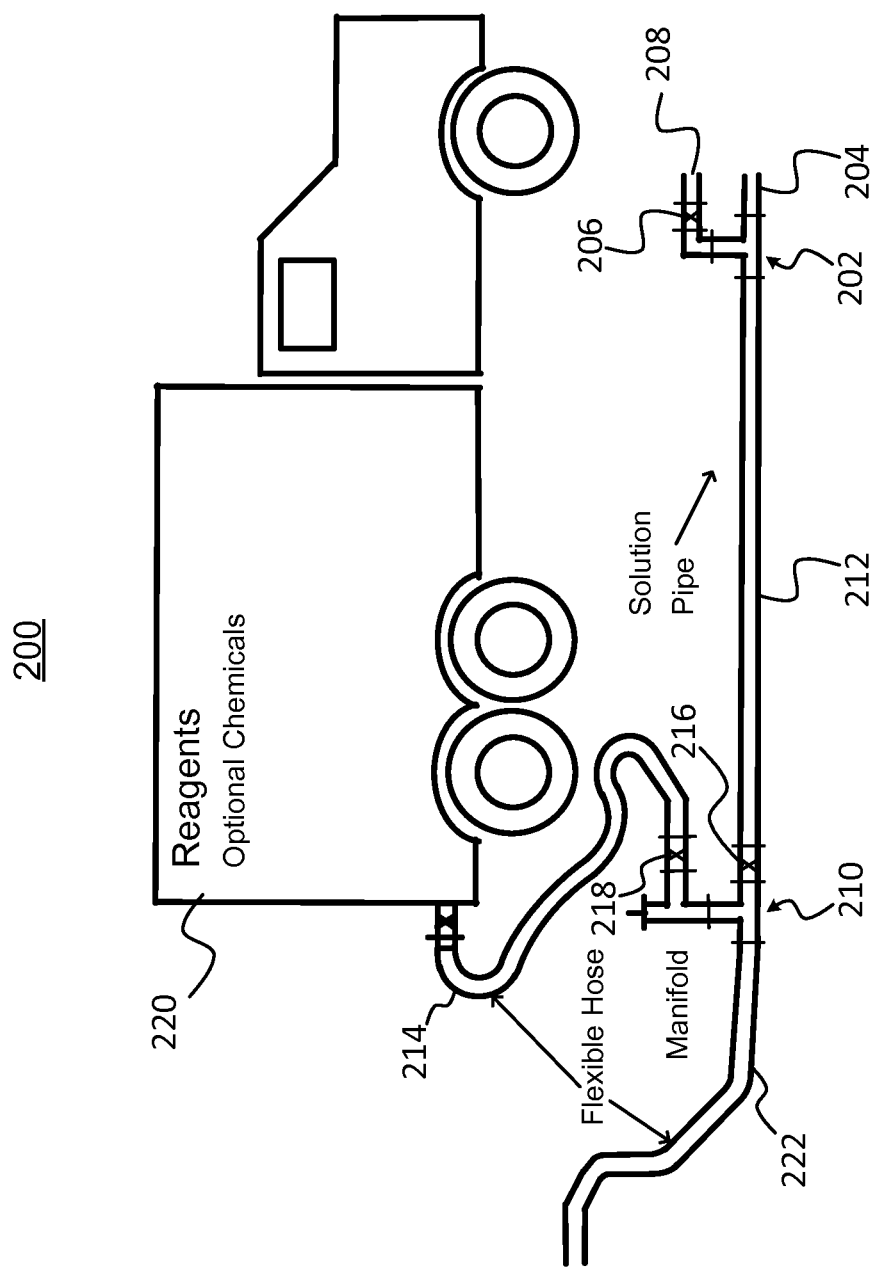
FIG. 2 is an illustration providing further details of the manifold section 200 of FIG. 1.

Referring now to FIG. 2, the manifold section 200 will be described in greater detail. The manifold itself may be a nest of pipes, conduits, fittings, couplers, valves, and flanges. The manifold is configured to mix and regulate combinations of fluids including the mixing of chemicals and reagents, gases, liquids and solids in a slurry, that will make up the treatment fluid to be pumped into a targeted zone and collection containing minerals in a pile thereby altering the chemistry and biochemistry in the local in situ pile environment. The manifold section 200 is designed for ease of assembly and disassembly so it can be readily moved to different portions of a collection or to other collections and piles.

A first end 202 of the manifold section 200 may connect to one or more pipes 204 for delivery of a fluid that may include gases, chemicals, reagents, solids, solutions and pulp, and the like, separately or in combination, referred to herein as a "fluid" or "treatment fluid". The first end 202 of the manifold section 200 may be configured to regulate fluid flow and allow other fluids and/or slurries to be mixed with the fluid by way of valves, such as first valve 206, and attached hoses or pipes 208 to deliver other reagents and chemicals for treatment.

A second end 210 may also be configured to control the flow and mixing of reagents to the downstream apparatus or system. The second end 210 may connect the fluid pipe line 212 with a flexible hose 214 and may have several ports with valves to accommodate fluid flows. For example, second valve 216 may be used to regulate the flow of fluid coming into the second end 210 through line 212 and third valve 218 may be used to regulate the flow of addition reagents through flexible hose 214. The diameter of the nest of pipes, ports, valves and other components of the manifold section 200 may be sufficiently large so as to support the volume of treatment fluid to be induced into the well, as further described below. In regulating the flow of fluid and the flow of chemicals (reagents, acid, base, etc.), the ports may also be fitted with valves that are configured to control mixing and mixtures of reagents and fitting adapters to hoses and reagent pipes. The manifold section 200 may be configured to enable the addition of reagents, including, but not limited to high temperature reagents, to the fluid treatment fluid where mixing and cooling occurs.

Embodiments including different manifold designs that may enable the mixing and/or faster cooling of hot reagents when offloading from chemical/reagent tanks or tankers, such as vehicle 220 illustrated in FIG. 2. A first flexible hose 214 and second end 210 may enable vehicle 220 to be used to deliver reagents or other optional chemicals to the manifold regardless of where the manifold may be located on a collection and may also be used to facilitate off-loading. The length of first flexible hose 214 may be determined by the distance of the vehicle 220 from the second end 210 of the manifold section 200, and the diameter of first flexible hose 214 may be determined by the desired fluid flow. This flexible arrangement may enhance assembly and disassembly of the system 100 and the overall operation of the leaching process.

Figure 3:
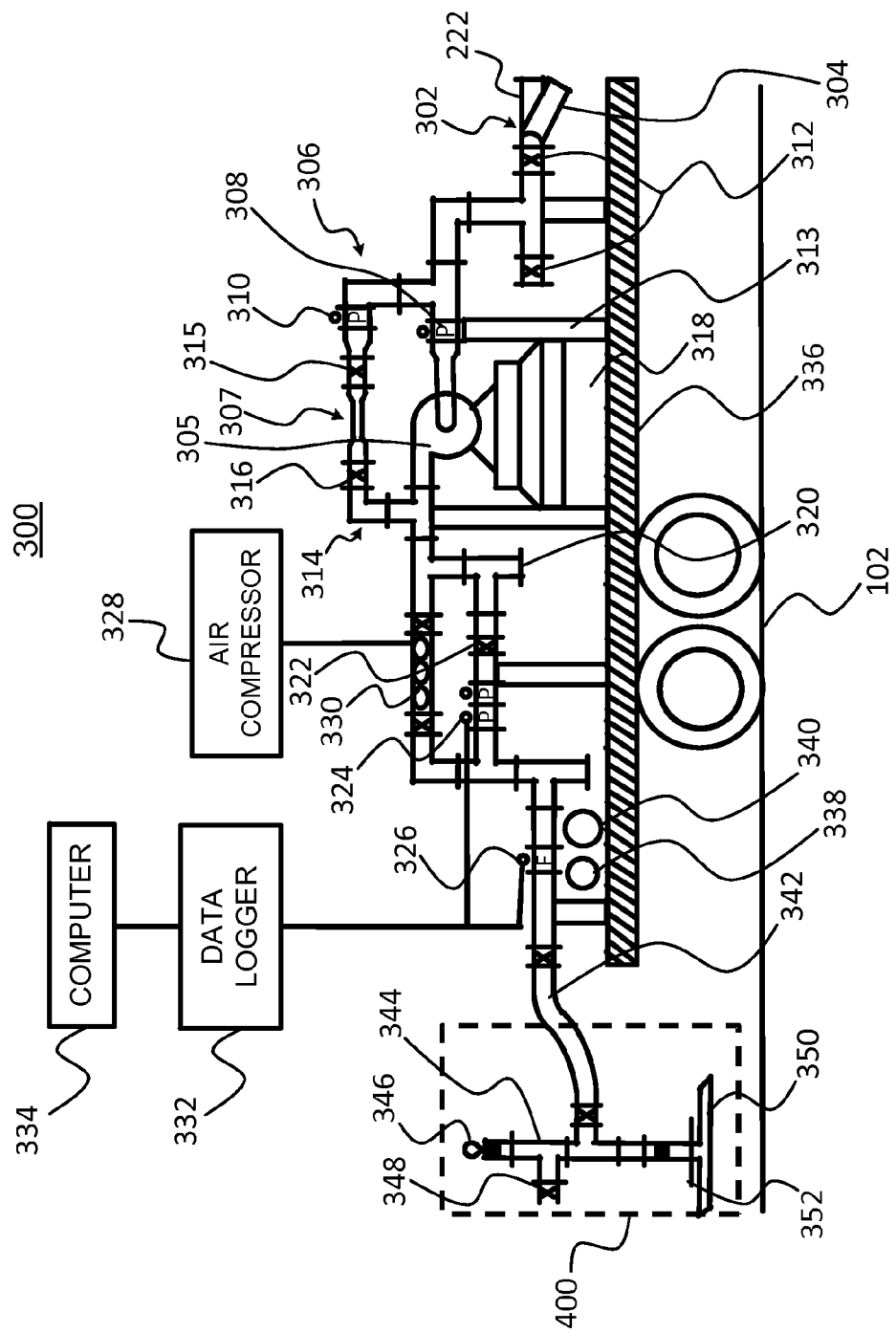
FIG. 3 is an illustration providing further details of the trailer pumping section 300 and the tree section 400 of FIG. 1.

A second flexible hose 222 may be configured to deliver the treatment fluid to the trailer section 300 further illustrated in FIG. 3. Second flexible hose 222 may also enable site versatility in that it may enable the system 100 to be position near an injection well, as well as the supply of treatment fluid and vehicle 220 for reagent transport and off-loading. A length of 20 feet or more for second flexible hose 222 may be sufficient, but other lengths could also be used. It may be preferable to use materials for second flexible hose 222 and other components of the manifold section 200 and system 100 that have resistance to chemicals, reagents, abrasion, pressure and temperature. In an embodiment, the flexible hoses 214 and 222 may comprise, but are not limited to, braided stainless steel flexible hoses configured to withstand the higher temperatures, resistance to abrasion (e.g., longer life), and greater flexibility.

With reference now to FIG. 3, the inline filter 302 of the trailer section 300 is connected to second flexible hose 222. In an embodiment, the inline filter 302 is configured to remove particles in the treatment fluid that could clog up the trailer section 300 or other downstream sections and damage a pump, as further described below. The inline filter 302 may be configured to include a screen that includes screen holes sufficient to remove large solids while reducing friction loss, and which can be readily purged of collected solids. In an embodiment, a purging valve (not shown) may be used to purge the inline filter and to ease disassembly for cleaning. In an embodiment, a pressure drop across the filter may be measured to show when the inline filter 302 requires purging and/or cleaning. In an embodiment, the inline filter 302 may include a vacuum break (not shown) to prevent treatment fluid from being siphoned backward in the event of a pressure build up in the inline filter 302. In an embodiment, the inline filter 302 may be formed of stainless steel to reduce potential corrosion. Other material may be used if compatible with the reagents and treatment fluid chemistry.

In an embodiment, the inline filter 302 may include a connection to a variety of spool pieces or coupler pipes that have different lengths and angles to adjust and align the inline filter 302 coupling to the second flexible hose 222, which may facilitate rapid cleaning, purging and flexibility of installation. In an embodiment, a purging pipe 304, with fittings to direct the pressurized grit and reagents away from the system and crew may be incorporated into the inline filter 302.

Once the treatment fluid has been filtered, it enters the pump inlet piping section 306, which may be configured to connect the inline filter 302 to the pump 305 and bypass and eductor 307, both of which are further described below. The pump inlet piping section 306 may include a pressure gauge 308 and a pressure transducer 310 configured to monitor pump 305 inlet pressures, which in combination with outlet pressure gauges, enable the calculation of changes in pressure versus volume imparted by the pump to stimulate each zone. In an embodiment, the trailer section may be configured to support the pump inlet piping section 306 so that inline filter 302, flexible hose 222, and manifold section 200 may be connected to either the right or left side of the trailer section 300. In an embodiment, the pump inlet piping section 306 may be readily isolated from one side to the other of the trailer section 300, depending on the physical configuration of the collection area. In an embodiment, the pump inlet piping section 306 may be replicated on both sides of the trailer section 300 and a valve 312 on each side of the trailer section 306 may be used to shunt treatment fluid flow on the unused side of the trailer section 300.

As further illustrated in FIG. 3, the pump inlet piping section 306 may connect the inline filter 302 and spool piece to the suction side of the pump 305 and various high pressure return lines from the pressure side of the pump 305. In an embodiment, pump inlet piping section 306 may be a nest of pipes, conduits, fittings, couplers, valves, instruments, flanges, connectors, spool pieces, angle fittings and pipe support structures, (four of which are shown, but only one of which is labeled as support 313 in FIG. 3 in order to simplify the illustration of the drawing). Additional support structures may also be used. In an embodiment, the pump inlet piping section may include one or more bypass and eductor piping loops 307, only one of which is shown in FIG. 3. In one embodiment, more than one such loop 307 may be used, one for reagent addition and pump bypass and the other for cooling the pump engine. Both piping loops 307 extend from the pump inlet piping section 306 to the pump outlet piping section 314, with valves 315 and 316 on the ends of the piping loop(s) 307.

Pump 305 may be a high pressure-high volume pump(s) configured to connect the pump inlet piping section 306 to the pump outlet piping section 314. The pump 305 may be configured to easily handle solids that are of lesser size than the inline filter 302. The diesel pump-engine 318 may be configured to enable real time changes to the pressure and flow settings and to enable measurement of the in situ permeability in the collection, versatility for stimulation depths and zone stimulation under a variety of ore types and sizes, collection height, in collection voidage, and connecting treatment fluid delivery capacity. Real time monitoring of the flow and pressure, using sensors and data logging as described below, enables control of the stimulation geometry, which determines the effectiveness of the treatment.

In an embodiment, the pump 305 may be a centrifugal pump with a 21 inch impeller that is powered by a diesel engine with a revolution per minute (rpm) controller. Current embodiments can stimulate piles from about 20 feet to over 600 feet deep, with pressures over 250 pounds per square inch (psi) and flow rates over 1,300 gpm. Embodiments are configured to move up to approximately ⅜ inch solids of corrosive and abrasive chemical slurries at elevated temperatures.

As embodiments described herein do not rely upon hydraulic fracturing of the material within the pile/collection, it is important that the pump 305 create sufficient pressure, and the treatment fluid be of an appropriate composition, so as to lift and mobilize material (rock and other materials) within a zone being stimulated, so as to create channels or fluid pathways in the unconsolidated material through which the treatment fluid may flow in a largely horizontal path for some length through the zone. The structure of the material in the pile may prevent the treatment fluid from travelling in a straight horizontal path. In addition, gravity and a loss of pressure over distance will eventually begin to cause the treatment fluid to travel in a vertical direction. Overall, however, much of the treatment fluid will travel along a substantially horizontal path or channel for a measurable distance through the zone from the drill casing. That measurable distance may range from ten feet to hundreds of feet. While much of the treatment fluid will follow the channel, some treatment fluid will vertically percolate from the channels as well, increasing the overall treatment of the zone. Hence, embodiments develop substantially horizontal channels that facilitate horizontal and vertical percolation and treatment through the zone being stimulated.

The bypass and eductor pipe loop(s) 307 may be configured to connect the pump outlet piping section 314 to the pump inlet piping section 306. The bypass and eductor loop(s) 307 may be configured to enable the treatment fluid to flow without passing through the pump 305 by the use of one or more valves 315/316. This bypass of treatment fluid may enable treatment fluid to free flow (e.g., without flowing through the pump) and therefore enable measurement of the in situ permeability of the pile. The bypass and eductor loop(s) 307 may be comprised of a nest of pipes, conduits, flanges, connectors, spool pieces, angle fittings and an eductor, not all of which are shown in FIG. 3. This pipe and valve configuration may allow treatment fluid flow in both directions depending on the position of valves 315/316 and whether the pump 305 is operating. A bypass and eductor loop 307 may optionally be included that is configured to connect, via valves (not shown), the pump outlet piping section 314 with the pump inlet piping section 306 and to induce a vacuum to the bypass pipe loop. Both the bypass and educator loop(s) 307 may enable the addition of other fluids, pulps, reagents and chemicals to the system 100 without an additional pump being required.

The pump outlet piping section 314 may be configured to connect the pump 305 and bypass and educator loop(s) 307 to the pump inlet piping section 306 for transfer of reagents to the treatment fluid. The pump outlet piping section 314 may include: drain down fittings and valves 320; additional pump bypass 322 configured to route treatment fluid around other equipment so as to enable equipment cooling, mixing reagents, and operational solutions as discussed above; pump outlet pressure gauge and pressure transducer 324; flow meter 326; air injection and inline mixer pipe loop 330 which, as further described below, may be configured to enable compressed air to be used as a reagent, to be metered into the treatment fluid from a high pressure air mechanism at high solution pressures, promoting the mixing of the air in the inline mixer 330, thus significantly increasing the concentration of dissolved oxygen in the treatment fluid; and gas injection and air injection and inline mixer pipe loop 330 which is configured to enable compressed gas or a mixture of gasses, as reagents, to be metered/injected into the treatment fluid from a system of gas storage cylinders through a combination of tubes, compressors, pipes, hoses, valves, check valves, gauges, and flow meters at pressures greater than the high solution pressures, promoting the mixing of the gas in the inline mixer, and thereby significantly increasing the concentration of dissolved gas or gas mixtures in the treatment fluid.

The air mechanism is configured to compress outside (in situ) air via a low volume, high pressure air compressor 328, and thereafter transport and deliver that regulated compressed air for a number of uses, including by an inline air receiver tank via pipe, tube and valves; the air injection and inline mixer pipe loop 330 via pipe, tube, valves, flow meter; a downhole inflation line via pipe, tube, valves, regulator and hose reel; a downhole zone isolation mechanism: a reagent addition and pneumatic valve control; and miscellaneous uses of pressurized air like pneumatic tools, tire inflation, etc. The high pressure, air mechanism is configured to compress outside air via a low volume (such as 33 L/min), high pressure (such as 1,000 psi) compressor, as only a modest amount of compressed air is required at any one time. The mechanism may be comprised of the compressor 328 and a nest of pipes, conduits, tubes, hoses, valves, connectors, flow meters, tanks and instruments.

The air injection and inline mixer pipe loop 330 (also referred to as a "mixer" herein) may be configured to meter and mix compressed air into the treatment fluid. In an embodiment, the mixer 330 may be configured to enable super saturation of dissolved oxygen into the treatment fluid, as well as the metering and mixing of other gases instead of air or oxygen. The mixer 330 may also be comprised of a nest of pipes, conduits, valves, flanges, connectors, spool pieces, angle fittings and an inline mixer. As the mixer 330 is downstream from the pump 305, the mixer 330 may be configured to accommodate 1,000 psi compressed air from the air mechanism, versus relying upon compressed air or gas from cylinders or tanks that have to be transported to the well site. The use of the air mechanism in combination with the mixer 330 also enables the system 100 to stimulate areas within the pile at depths greater than 200 feet without the need for hydraulic fracturing. In addition, by mixing reagents and chemicals into the treatment fluid in the manifold section 200, versus in the inline mixer 300, corrosion and abrasion within the mixer may be significantly reduced.

In an embodiment, the system 100 may be equipped with a real time monitoring system or data logger 332 and computer 334 that may be configured to monitor fluids and gases within the system 100 and characteristics of those fluids and gases so as to track system performance and the physical properties encountered in the zonal stimulation of ore deep in the pile/collect. This monitoring determines the overall efficiency of stimulation by monitoring one or more of: inline filter inlet and outlet pressure; pump inlet and outlet pressure; air and/or gas injection and inline mixer pipe loop fluid flow; downhole isolation mechanism pressure (which enables higher pressures allowing the system to stimulate to much greater depths of wells); pump drive motor performance, rpm, temperature, fuel usage, horsepower, torque, etc.; pump volume (gpm and total); and time. In an embodiment, the data logger may include a commercially available data logger with a 4-20 mA input and output to a flash drive, or configured to communicate remotely with a local or remote computer through known means.

All of the above-noted components of the trailer section 300 may be mounted on a flat-bed type, or other type, of trailer 336 that is configured to align such components with supply fluids and the well into which such fluids are going to be pumped, and to dedicate all of the pumped fluids to a specific zone at a specific depth within the collection. In addition to easing positioning of the trailer relative to the well to be drilled, the trailer may facilitate the ready modification of selected components so as to enable the system 100 to achieve specific results.

The trailer 336 may be configured and fabricated for ease of operation, safety, maintenance, transportation, keeping the equipment clean, with storage of parts, tools, fuel, etc. In an embodiment, all the equipment on the trailer 336 may be operated from the ground, thus keeping the operators from climbing onto the trailer 336 and risking an injury. The 336 trailer may also be selectively designed and fabricated with swivel leveling feet to allow the feet to swing horizontal for travel over rough, uneven ground without (or with minimal)

damage to the feet. The trailer 336 may also be used to stabilize and support the various components during use and to ease assembly and disassembly.

Additional components that may be mounted to the trailer 336 include, but are not limited to, hose reel 338 and compressed air receiver tank 340. Hose reel 338 is configured to enable a high pressure tube or hose from the high pressure air mechanism to be metered out safely and to inflate and deflate the downhole isolation mechanism down in the well, as further described below. The reel 338 may include many feet of inflation tube that coils. As this may present a tripping hazard, it may be desirable to protect the inflation tube as it contains high pressure air or gas that could cause significant injury or damage if damaged or allowed to come loose. The inflation tube is connected to the air receiver tank 340, through valves, pipe, tube, hose, ducts, fittings and the hose reel, down the well to the downhole isolation mechanism. The air receiver tank 340 may be configured to operate as a reservoir for compressed air generated by the high pressure air mechanism so that mechanism is only required to operate intermittently with a drop in pressure. In an embodiment, the tank 340 may be a 72 cubic foot, 4,500 psi tank and may be mounted horizontally across the trailer and connected as necessary by a nest of tubes, hoses, ducts, pipes, conduits, valves and gauges.

The tree section 400, also illustrated in FIG. 3 as the area within the dashed line, may be comprised of a nest of pipes, conduits, valves, flanges, connectors, spool pieces, angle fittings, and adapters configured to connect high pressure flexible hose 342 to the downhole injection pipe 344, to ease assembly/disassembly and to reduce pressure in the system 100 prior to disassembly. The hose 342 is configured to enable treatment fluid to flow from the pump outlet piping section 314 to the tree and enables the tree section 400 to be removed from the top of the well for ease of adding and removing joints of the downhole injection pipe, so as to change from one perforation zone to another in the downhole well. In an embodiment, the hose 342 is between 8-10 feet in length and is formed of a flexible conduit or hose with couplers/flanges that can withstand the internal pressure and temperature of the treatment fluid, and has resistance to chemicals, reagents and abrasions used in the treatment fluid.

The tree section 400 also helps to insure that the downhole injection pipe will not fall down the well. In an embodiment, the tree section 400 may include a picking eye 346 fabricated and installed so the tree can swivel on and off the well head with ease, including rapid assembly and disassembly, and to bleed off fluid pressure prior to disassembly (essentially acting as a vent for the downhole section 500). The tree section 400 may also include a sample port 348 for testing the treatment fluid. The tree section 400 may be designed and fabricated to safely support itself during disassembly of the downhole injection pipe during changes in the stimulation depth, from one zone to another.

The tree section may further include a table 350 with a flat, substantial plate of steel, with preferably rounded corners for safety, which attaches by bolts to the downhole well head and downhole collar to support the foot clamp 352, the downhole injection pipe, the downhole isolation mechanism, and all the tooling and equipment inserted through a hole in the table into the cased well during the stimulation. In addition, in order to maintain the foot clamp 352 centered over the well, a unique pattern of steel bar stock are welded to the table 350 as stops to maintain the position of the foot clamps without altering the foot clamp's function. The foot clamp 352 may be a standard drill tool modified to handle the larger downhole injection pipe and inflation tube. The modifications are done in a manner as to not significantly distract from the structural integrity of the foot clamp while enabling the foot clamp 352 to handle a larger pipe application than is typically used in well-based treatment operations.

The location of each well for a pile is determined based on the chemical analysis of one or more pile samples taken from the pile and/or solution from the pile and pile history, rather than any form of geophysical surveying. While the term "geophysical surveying" can involve a number of different principals, such as the utilization of chemicals, dyes and/or one or more instruments spread across the surface of the pile/collection, and sometimes within the collection and/or well, from which various geophysical properties can be sampled, such as chemical compositions, gravity, heat flow, vibrations, conductivity, electricity, electromagnetic waves, magnetism and fluid dynamics, geophysical surveying does not involve the use of pile samples. In contrast, in an embodiment, based on pile history and/or the chemical analysis of the pile samples, determinations may be made on where a well should be located. For example, if a particular pile sample revealed that a particular section of a pile contained more than an expected level of potential hazardous or chemical conditions, thus suitable to be a target for treatment, that particular section of the pile could become the location of one or more wells.

Each well may be uniquely designed for each location. This unique design is dependent upon the specific zone and volume of pile that contains the target condition to be treated. The installation of the well includes the use of a drill pipe 104 and drill casing 106 to fit the potential fluid flow and stimulation process. The well has a welded wellhead (not shown) attached on the top of the well to attach the table and the remainder of the system 100.

Figure 4:
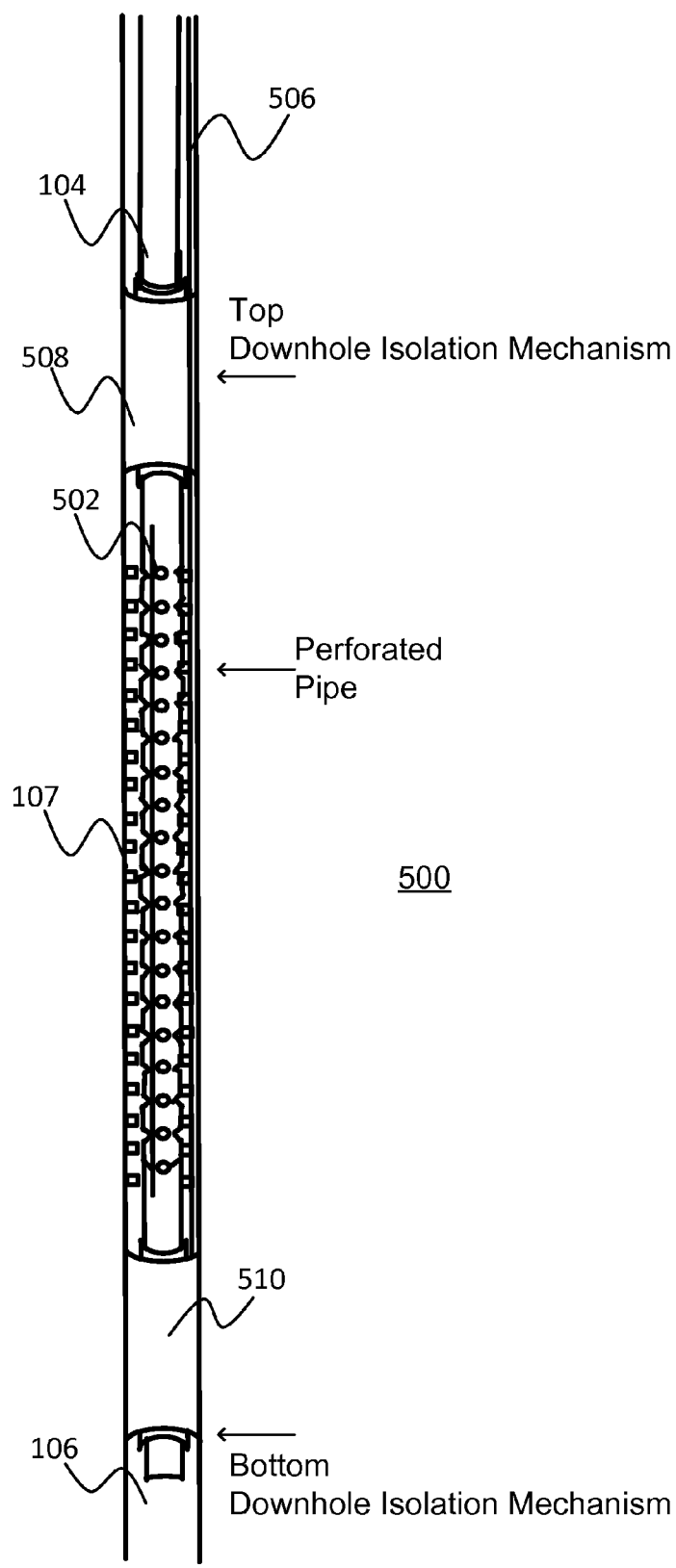
FIG. 4 is an illustration of the down well section 500 of FIG. 1.

In particular and as further described below, the drill casing 106 may be perforated and designed, fabricated and installed for each unique location. The drill casing 106 keeps the pile (rock and sand) from flowing into the well and enables treatment fluid to pass into the pile via specifically designed perforations 107 at specific depths or zones. As illustrated in FIG. 4, the perforations 502 of the injection pipe 104 are aligned with the perforations 107 in the casing 106. The perforations 107, at least, are configured in a unique pattern to direct the treatment fluid flow during stimulation (pumping) in a specific angular direction or arc or unilaterally (360 degrees) into a targeted volume of material or zone in a pile. In an embodiment, the downhole perforations 107 may be designed and fabricated such that the sum of the perforation opening at each zone into the pile are greater than the cross section area of the well, so as to not impede fluid flow through the well casing 106. For example, if it were determined that a zone of a pile to the north of the well largely remains in need of treatment, while a zone to the south was largely not in need of treatment, the perforations 107 may be designed to all be located on the north side of the casing 106. Likewise, when a well is close to a lift crest or side-slope of a pile, the perforations 107 may be directed toward the body of the pile and not the side slope.

As further illustrated in FIG. 4, the downhole injection pipe or drill pipe 104 is inserted inside the casing 106. The downhole injection pipe 104 transports the treatment fluid from the surface of the well to the target perforations 107 down in the well. In order to fully utilize the available flow to new depths, the downhole injection pipe 104 may be a suitable diameter (e.g., outer diameter of about 4.5 inch or about 11.4 cm) by selecting pipe joints, for example HWT pipe, to carry the injection fluid, which allows the flow to be fully utilized and to significantly reduce pressure loss. The downhole injection pipe may include a downhole inflation line 506 and attachment mechanism configured to activate the downhole isolation mechanism and to ease operation while maintaining the integrity and construction of the downhole inflation line 506. The inflation line 506 may be a high pressure flexible hose or tube that will fit through the table 350 and foot clamp 352 and may be secured to the downhole injection pipe 104 in the tight space that exists between the pipe 104 and well casing 106. In an embodiment, the inflation line 506 may be secured to the downhole injection pipe 104 at each joint and in the middle of each joint to reduce wear and perforation or breach of the inflation line 506.

The downhole isolation mechanism 508/510 may be configured and selected to allow versatility of sealing each zone independent of the remaining zones in the well and to dedicate all of the pumped fluids to a specific zone at a specific depth. The mechanism 508/510 may be fabricated from one or more inflatable straddle packers selected to accommodate the high pressure (1,000 psi inflation), corrosive and abrasive chemical slurries and elevated temperatures. The downhole isolation mechanism 508/510 is configured to straddle the zone, with one unit above mechanism 508 and one unit below mechanism 510 designated with sufficient space above and below the zone such that the downhole isolation mechanism can seat and seal the zone from the remainder of the well. The downhole isolation mechanism is inflated from inflation line 506 from the hose reel 338, through pipes, valves, fittings, tubes, and a pressure gauge, connected to the air receiver tank 340. The zones are usually stimulated beginning from the bottom of the well and ending at the top of the well in order to reduce the weight of the injection fluids on underlying zones.

In order to store the downhole injection pipe 104 in a safe, clean manner, a pipe rack may be configured and constructed. In an embodiment, two pallets may be placed flat on the ground and arranged with their boards parallel to the pipe to be placed on them, thereby supporting the downhole injection pipe 104 off the ground. Spacing the two flat sections apart may allow the insertion of a chain or strap under the stack of pipe for lifting the pipes. In addition, a third section may be placed upright and perpendicular to an end of one of the flat sections, and away from the well, and secured to the flat laying section by fasteners and angled members. This pipe rack configuration minimizes rolling and slipping of the downhole injection pipe onto walkways and crew, while keeping the downhole injection pipe clean and easily accessible for installation in and out of the well.

A boom truck or crane may be used to support the installation of the downhole/down well section 500, including the injection pipe 104, the inflation line 506 and the isolation mechanism 508/510. The truck or crane can also transport and assist with the assembly and disassembly of the system 100 from well to well. In an embodiment, the boom truck may be a 26-ton flatbed boom truck or crane with out-rigging stabilizers with sufficient reach and mobility to safely maneuver the downhole mechanisms up and down the well during operation and assemble/disassembly.

An electrical generator (not shown) may also be used to power electrical equipment used by the system 100 when operating in remote locations. In an embodiment, the generator may be selected for low fuel consumption, quiet operation, ease of maintenance and reliability at high altitudes, enabling the operation of the equipment for high altitudes. Other special tools and features that may be needed to support operation of the system include; a picking bale for HWT pipe configured to lift the downhole injection pipe 104 and downhole tools; a tree section 400 lifting eye; a stand for supporting the tree section 400; an inline filter blow down; a purge pipe that may be placed to direct the blow down from the inline filter away from the crew and trailer; a downhole isolation mechanism maintenance work station; a trailer section 300 work station; and a flow meter protection hood. The flow meter protection hood may be a steel hood, or similarly strong material, that is configured to protect the flow meter, especially during windy operation when components being lifted by the boom truck could be blown into the trailer section 300 and potentially damage the flow meter and other expensive equipment.

Operation of the system 100, marketed under the trademark NEUTRA-JEX™, will now be described. After identifying an area or zone of the pile to be treated, a well hole is drilled and the drill casing 106 and downhole injection pipe 104 are installed. One or more of the various downhole components described above may then be installed in the well while the system 100 is set up and laid out for safety and ease of operation. In order to determine the permeability of the pile at a zone before and after stimulation, the in situ permeability of the zone is tested by introducing fluid into the well and measuring the permeability of the zone. The zone can then be stimulated for some predetermined or calculated period of time, which is determined by a large number of factors, including the type of pile, the target materials, the prior level of treatment, the chemistry of the pile, etc. After stimulation, the in situ permeability of the zone can then be retested to determine whether stimulation caused any measurable change in permeability (which can also be mathematical modeled based on various measured physical parameters). Additional, subsequent stimulation may include, but not limited to: changes to pump or compressor speed and pressure; changes to flow volumes; the addition of reagents; different mixes of treatment fluids; dissolved oxygen and other gases; extra chemicals, reagents, biological, inorganic and organic, etc.

Once a zone of the pile has been sufficiently stimulated so as to hydraulically rechannel the zone/collection, and a sufficient period of time has elapsed, an impacted or stimulated (pumped) zone may be ready for re-treatment of the conditions in that zone. This retreatment may be made with a different composition of treatment fluid, possibly with different or additional reagents, to further treat the condition in the pile. For example, the flow rate may be optimized and the process may be improved by adding new fluids over a period of time, such as a 3-5 day period, and correlating the volume of fluid added to the sum of the void space in the impacted zone of pile (e.g., calculating the volume required to maximize treatment conditions). The normal fluid pressure and flow may be sufficient to wet and retreat the impacted zone.

Figure 5:
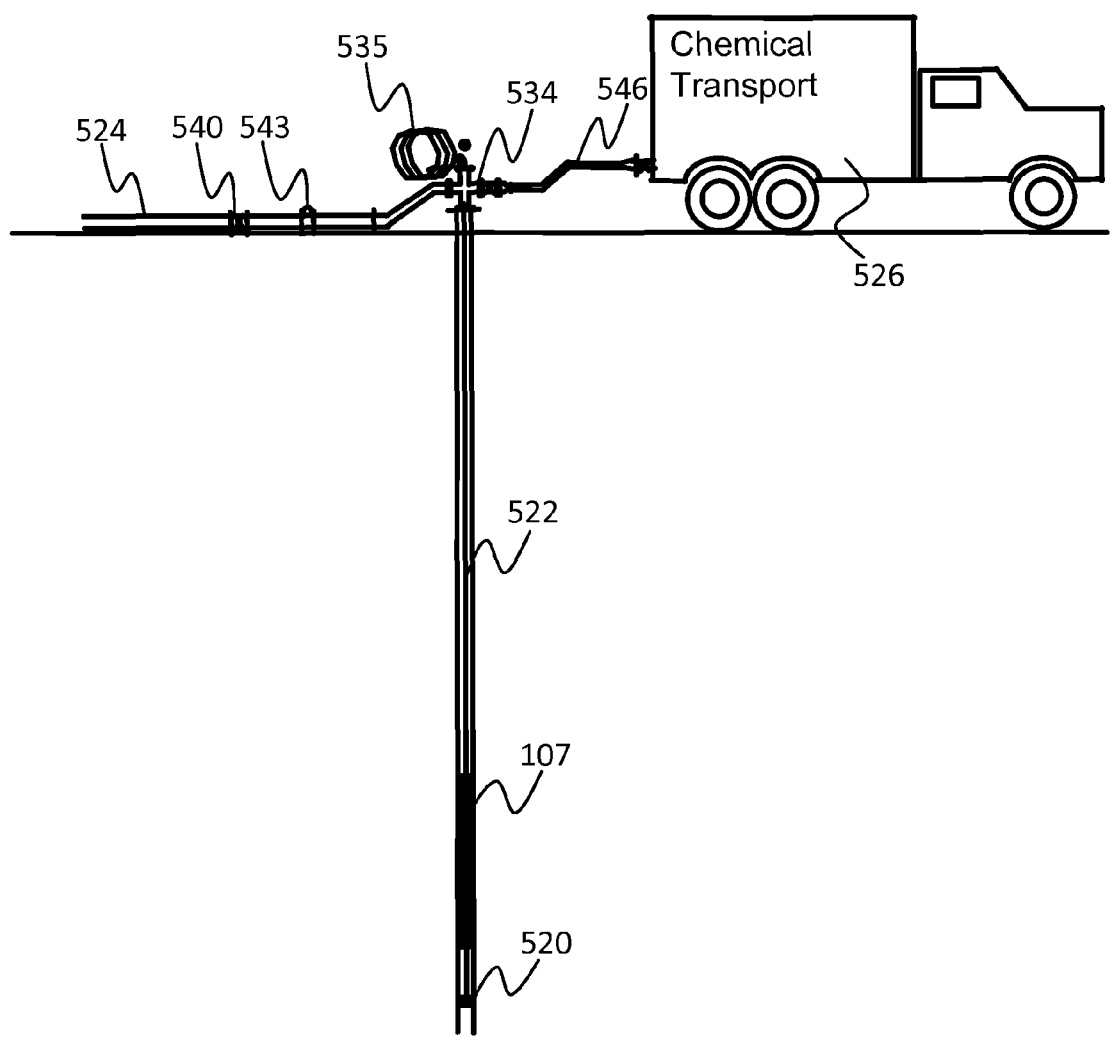
FIG. 5 is a further illustration of the trailer and tree sections of FIG. 1.

The retreatment process is further illustrated in FIG. 5. After the downhole isolation mechanism 508/510 is removed from the well, a plug 520 may be inserted and moved up and down the well bore so as to direct fluid to a selected zone. The plug 520 may be configured to easily move up and down the well, suspended on a cable 522 with optional depth indicator tags, the combination of which is referred to herein as the retreatment plug system. The retreatment plug system may be configured to provide a relatively tight seal within the well below the target zone (i.e., below the perforations 107 of the drill casing 106), thereby isolating the target zone and closing off the drill casing 106 below the releach plug 520 from significant bypass of fluids around the releach plug 520. The plug 520 may be configured to include one or more mechanical devices that allow the plug 520 to spin freely and to continue its operation in the presence of any spinning action that may be induced by the rinsing action. (e.g., neutralize Coriolis effect).

The retreatment system is designed to take advantage of the fact that a falling column of fluid in a well that has rapid evacuation at a selected zone will impart a partial vacuum at the well head. For example, after a zone is stimulated, voids may be created in the pile that allow rapid evacuation of fluids from the drill into the pile and prevent solution building head in the well. When solution is flowing down the well casing 106 to the plug 520, the falling fluid imparts a vacuum to the well head 534 and/or attached tee or cross fitting of the tree section 400. This vacuum allows chemicals, reagents and fluids to be added to the selected zone, down the well without any further pumping. If solid reagents are added prior to installing the cross or tee 534, these reagents or chemicals must be dissolvable by the fluid to prevent closing or blocking the perforations in the well casing 106 over time. This addition of reagents, chemical and fluids to the falling treatment fluid allows mixing and gas saturation into the treatment fluid. The reagents and chemicals may be supplied by chemical transport 546. The tee or cross fitting 534 could be used in place of the components of the tree section 400 illustrated in FIG. 3, or the components of the tree section 400 could be used in place of a tee or cross fitting 534 during retreatment operations.

The suspension cable 535 to which the plug 520 is attached may be selected to have sufficient strength to support the entire weight of the retreatment fluids at depth, plus its own weight. In an embodiment, the suspension cable 535 may be formed of stainless steel cable. Optional Footage tags (not shown) on the suspension cable 535 serve to locate the zone in the well. Referring now to FIG. 5, the suspension cable 535 may be designed and fabricated for easy up and down movement in the well, i.e., to move from one zone to another, without loss of functionality over time. The suspension cable 535 may be raised and lowered by any method, but in an embodiment a simple winch mechanism may be used. In a second embodiment, a cable clamping tool (not shown), which is attached to a chain, strap, or short cable, may be used. When the cable clamping tool is attached to the suspension cable 535, it also is attached to a small motorized vehicle to lift the suspension cable 535, cable clamp(s), and retreatment plug 520 up and down the center of the well. When the plug 520 is in place below the selected zone, a slotted plate may be inserted in an opening at the top of the tee or cross fitting 534, where a slotted plate may be able to catch a cable clamp on the cable 535 in the slot, thus suspending the retreatment plug system. The unused top cable and unused attached cable clamps are stored in a coil or placed around a hose reel.

A fluid pipe 524 may be connected to additional angled pipe fittings and spool pieces (not shown) to make a connection to an elevated tee and/or cross fitting 534. A valve 540 may be used to regulate the flow of treatment fluid from barren pipe 524. The flow of treatment fluid can be monitored by flow meter 543, which could include a Doppler clamp and flow meter for non-intrusive flow detection. Likewise, a valve 544 may be used to regulate the flow of reagents and chemicals from the chemical transport through flexible hose 546.

As noted, treatment fluids and fluids containing reagents and chemicals may be added during retreatment into the well, directed by the plug 520, through the well casing perforations 107 into the previously impacted zones created by the stimulation system. The volume and quantity of retreatment fluids added is in correlation to the chemical conditions of the previously impacted zone. The zones may be retreated and new reagents and chemicals may be added generally from the top zone in the well downward, one zone at a time. Thus, the retreatment curtain of fluid is flowing down through the previously impacted, channeled material from top to bottom, treating the pile with good sweep efficiency and again adding new reagents and chemicals to renew the treatment process until the next time that zone is selected for retreatment, if needed. The time spent between retreatment, well and zone selection is determined by the treatment cycle and the resultant chemical conditions in the pile.

In an embodiment a system for treatment of a target zone in a pile from a collection of materials over a collection pad through a treatment process, comprises: a manifold configured to transport a treatment fluid for chemical and/or biological treatment of a zone within the collection containing the zone to be conditioned and to transport and combine the treatment fluid with one or more chemicals to form a treatment fluid; a mobile platform configured to receive the treatment fluid from the manifold, mix the treatment fluid and move the treatment fluid into a tree section configured to be connected to the mobile platform and connected to a well head of a well drilled into the collection above the zone; and a downhole section including a drill casing having a perforated casing section configured to be installed into the well from the well head, a drill pipe having a perforated pipe section configured to be inserted into the drill casing from the well head and to position the perforated pipe section with the perforated casing section, and an isolation mechanism configured to be inserted into the well from the well head and to seal the drill casing above and below the perforated casing section so as to isolate the flow of treatment fluid pumped into the tree section, through the well head, down the drill pipe, through the perforated pipe section and through the perforated casing section into the zone so as to lift and mobilize some of the materials within the zone of the collection so as to create a plurality of substantially horizontal channels within the zone through which the treatment fluid flows to treat the target zone of the pile and alter the chemistry, physical properties, and biochemistry in the local in situ pile environment.

Figure 6:
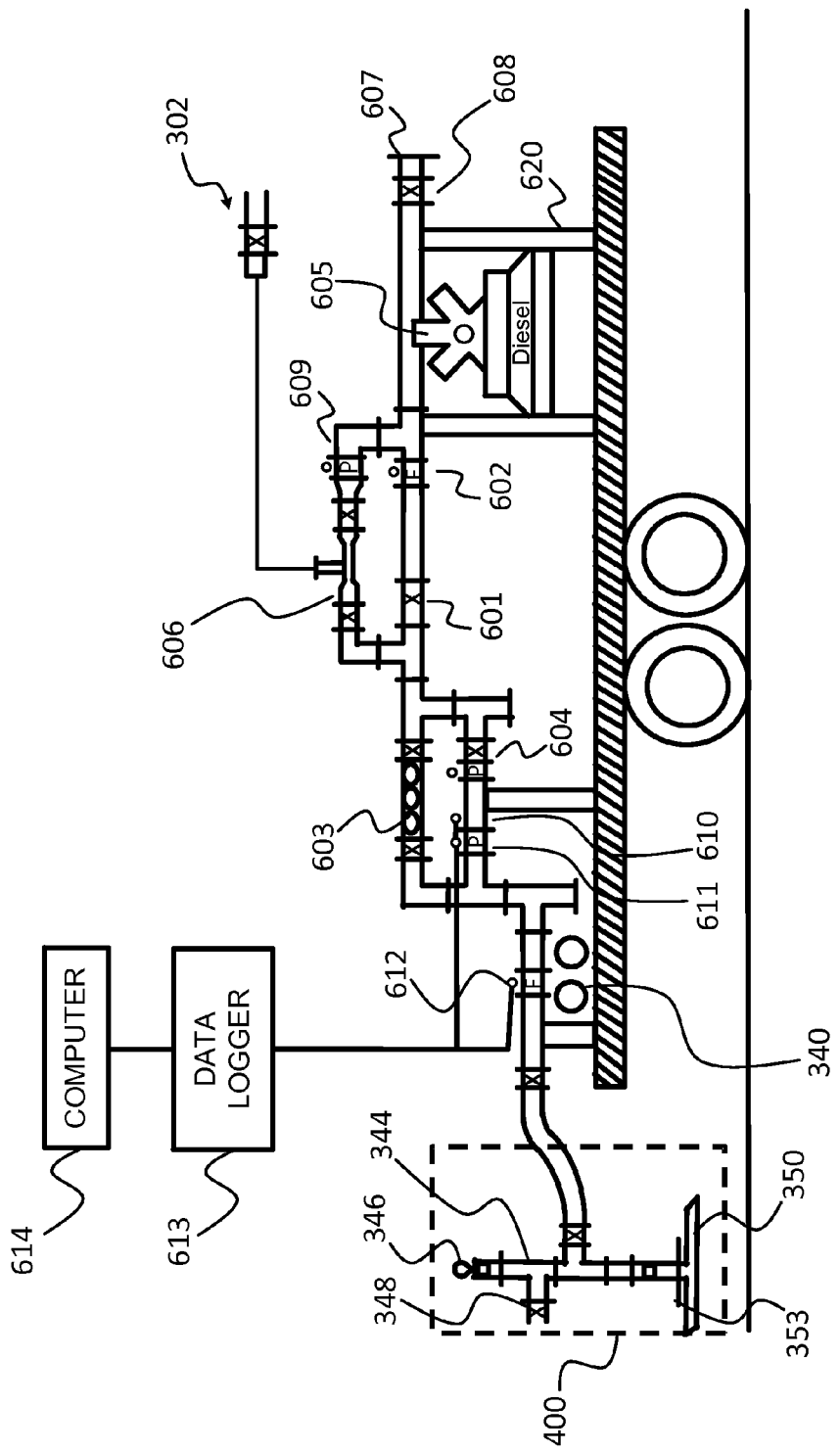
FIG. 6 is an illustration of a system for adding additional reagents and chemicals to a selected zone in a pile post stimulation.

Turning now to FIG. 6, in an embodiment, once the treatment fluid has been filtered by inline filter 302, it enters the eductor inlet piping section 606, which may be configured to connect the inline filter 302 to the eductor 606 which is downstream from the compressor 605, both of which are further described below. The compressor inlet piping section 607 may include an air filter and a valve 608, which in combination with outlet pressure gauges 609, enables the calculation of changes in pressure versus volume imparted by the compressor to stimulate each zone. The trailer section may be configured with supports 620 that support the compressor inlet piping section. The eductor 606 acts like a paint sprayer capturing the treatment fluid and making a treatment aerosol. Valves 601 and 602 can control the volume and pressure bypassing the eductor 606. Thus, the system can stimulate the downhole zones without adding reagents, especially during an initial stimulation operation. The treatment fluid can be channeled through the inline mixer 603 or via the bypass 604. Instruments tracking the temperature, 610, fluid pressure 611, and flow 612, compressor drive motor performance, rpm, temperature, fuel usage, horsepower, torque, etc.; compressor volume (cubic feet per minute and total); and time. The data logger 613, may include a commercially available data logger with a 4-20 mA input and output to a flash drive, or configured to communicate remotely with a local or remote computer 614, through known means.

The compressed air and aerosol treatment fluids enter the tree section 400 as illustrated in FIGS. 3 and 6. Thus, the system illustrated in FIG. 6 is very similar to FIG. 3 by replacing some piping and a compressor for the pump. The system illustrated in FIG. 6 also uses the design used in FIG. 4.

All of the above-noted components may also be mounted onto a flat-bed type, or other type, of trailer 336 that is configured to align such components with supply fluids and the well into which such fluids are going to be compressed, and to dedicate all of the treatment fluids to a specific zone at a specific depth within the collection. In addition to easing positioning of the trailer relative to the well to be drilled, the trailer may facilitate the ready modification of selected components so as to enable the system 100 to achieve specific results.

The trailer 336 may be configured and fabricated for ease of operation, safety, maintenance, transportation, keeping the equipment clean, with storage of parts, tools, fuel, etc.

As previously discussed, additional components that may be mounted to the trailer 336 include, but are not limited to, hose reel 338 and compressed air receiver tank 340. Hose reel 338 is configured to enable a high pressure tube or hose from the high pressure air mechanism to be metered out safely and to inflate and deflate the downhole isolation mechanism down in the well, as further described below. The reel 338 may include many feet of inflation tube that coils. As this may present a tripping hazard, it may be desirable to protect the inflation tube as it contains high pressure air or gas that could cause significant injury or damage if damaged or allowed to come loose. The inflation tube is connected to the air receiver tank 340, through valves, pipe, tube, hose, ducts, fittings and the hose reel, down the well to the downhole isolation mechanism. The air receiver tank 340 may be configured to operate as a reservoir for compressed air generated by the high pressure air mechanism so that mechanism is only required to operate intermittently with a drop in pressure. In an embodiment, the tank 340 may be a 72 cubic foot, 4,500 psi tank and may be mounted horizontally across the trailer and connected as necessary by a nest of tubes, hoses, ducts, pipes, conduits, valves and gauges.

The tree section 400 also illustrated in FIG. 6, and previously described with respect to FIG. 3, may be comprised of a nest of pipe, conduits, valves, flanges, connectors, spool pieces, angle fittings, and adapters configured to connect high pressure flexible hose 342 to the downhole injection pipe 344, to ease assembly/disassembly and to reduce pressure in the system 100 prior to disassembly. The hose 342 is configured to enable treatment fluid to flow from the pump outlet piping section 314 to the tree and enables the tree section 400 to be removed from the top of the well for ease of adding and removing joints of the downhole injection pipe, so as to change from one perforation zone to another in the downhole well. In an embodiment, the hose 342 is between 8¬10 feet in length and is formed of a flexible conduit or hose with couplers/flanges that can withstand the internal pressure and temperature of the treatment fluid, and has resistance to chemicals, reagents and abrasions used in the treatment fluid.

The tree section 400 also helps to insure that the downhole injection pipe will not fall down the well. In an embodiment, the tree section 400 may include a picking eye fabricated and installed so the tree can swivel on and off the well head with ease, including rapid assembly and disassembly, and to bleed off fluid pressure prior to disassembly (essentially acting as a vent for the downhole section 500). The tree section 400 may also include a sample port 348 for testing the treatment fluid. The tree section 400 may be designed and fabricated to safely support itself during disassembly of the downhole injection pipe during changes in the stimulation depth, from one zone to another.

In an embodiment, a method for operating embodiments of the system described above may be as follows.

Step 1: Assemble the system as described above for stimulation of a well. This includes attaching conduits or pipes, filters, pumps, compressors, etc., for the treatment fluid that will carry the treatment reagents. If a downhole isolation mechanism is used, then it must be installed at the predetermined depth.

Step 2: If the downhole isolation mechanism is used, inflate the mechanism for at least five minutes before adding fluid downwell. The inflation pressure should be at least 20% more than the anticipated stimulation pressure. Once that inflation pressure has been achieved, shut off the inflation gas for five minutes and watch the inflation gauge(s) to detect if there is a leak and to verify that the isolation mechanism is properly inflated. If no isolation mechanism is used then proceed to Step 3.

Step 3: The conduits or pipes and valves for the stimulation fluids are opened allowing the fluid to flow down the well to the targeted zone or portion of a pile to be treated with a well. The pressure and flow of the parent fluid in the pipe is monitored to make sure that it is delivered for at least five minutes. These measurements are related to the permeability of the zone or portion of the pile impacted pre-stimulation.

Step 4: If a pump or compressor is utilized to increase the pressure of the stimulation parent fluid, then ramp up the pressure in incremental steps, either by pressure or flow or both. Record the somewhat stabilized flow and pressure at each increment for at least 5 minutes.

Step 5: As the pressure and flow of the parent fluid increase, a point will be reached when the pressure will reach a maximum value indicative of the stimulation pressure of the zone or well and the pressure will drop and the flow will dramatically increase. This pressure point is a function of the pile height, and physical properties of the pile. Maintain the flow of the parent fluid for at least 5 minutes before the next step Step 6: Now that the parent fluid flow has reached a somewhat stable maximum flow and pressure, which are indicative of the physical properties to the pile down the well for a period of time, additional treatment reagents and chemicals can be blended and added to the parent fluid. The quantity of reagents, chemicals and parent fluid will be designed to match the volume of the pile desired to be stimulated, treated and impacted. The chemistry and properties of each pile and zone in each pile is unique, so the volumes and character of the treatment fluid will vary accordingly. The flows and pressures of the system will vary as the physical properties of the treatment fluids vary.

Step 7: Continue measuring and adding treatment fluid until the volume of the pile is sufficiently impacted and stimulated. Depending on the density, bulk density, chemistry, mineralogy, pile height, size distribution, and physical properties of the material in the pile, etc. found in a zone, or well impacted by this stimulation, the time of treatment will vary. Common heap leach piles of run of mine material, which is blasted and truck dumped, have a range of treatment radius of 60 to over 100 ft (20 to 35+ meters). This treatment will involve the use of over 200,000 gallons (7,500+ cubic meters) of treatment fluid per zone and much more for entire treatment wells.

Step 8: The addition of treatment parent fluid will continue until a predetermined design set volume is reached. After all the treatment fluid is added, the addition of the parent fluid will continue for at least 5 minutes without additional chemicals and reagents to distribute the treatment fluids to the impacted volume in the pile.

Step 9: Drop the flow of the parent fluid in incremental steps while continuing to monitor the flow and pressure of the flowing parent fluid. Maintain each recording step for at least 5 minutes. Discontinue pumping and/or compressing the parent fluid and allow the parent fluid to flow down well for an additional 5 minutes under supply flow and pressure. These measured increment step up and down flows allow mathematical correlations to be made on the relative change in the zonal or well permeability of the pile.

Step 10: Move the downhole isolation mechanism or the apparatus from one zone to another or one well to another and begin again with Step 1.

Figure 7:
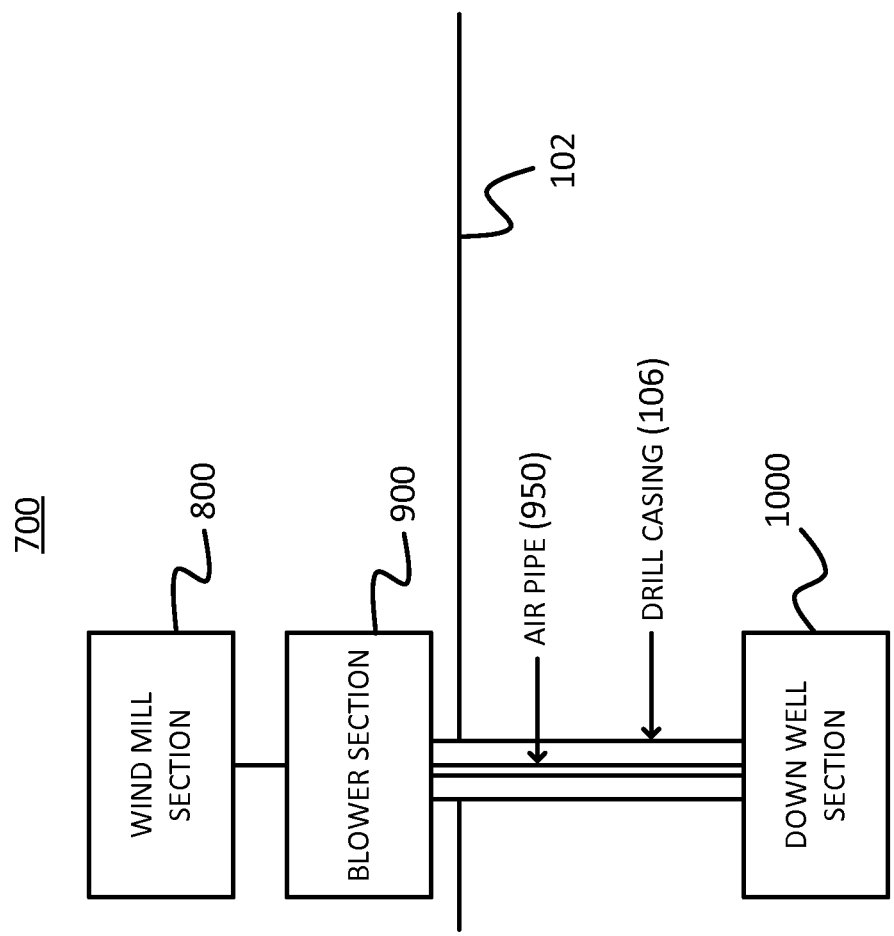
FIG. 7 is a block diagram of a system for introducing dry surface air to a selected zone in a pile.

Once the well has been stimulated by treatment fluids as demonstrated above, thereby opening channels in the pile, FIG. 7 illustrates an additional treatment system and method that may be followed. Operation of the system 700, marketed under the trademark DRY-JEX™, will now be described. Referring to FIG. 7, a green system 700 and accompanying method for changing the chemical, biological, and physical properties of one or more properties of interest in a pile 102 is illustrated. As shown in FIG. 7, an exemplary system may include three main sections: a wind mill section 800, a fan, blower, turbine, mechanical gear and bearing section 900, and a downwell section 1000. Utilization of the green system 700 may continually change the chemical, biological, and physical properties over time in a pile by harvesting the wind and solar energy at the site to induce additional fluids (including air) into the pile. The wind mill section 800 gathers local wind energy to generate mechanical energy for moving fluids up and down the stimulated well, 1000. The fan, blower, turbine, mechanical gear and bearing section 900, or combinations thereof, captures the mechanical energy from the wind mill section 800, and incorporates solar dried air from the local environment to act as a fluid to be moved up and down the stimulated well 1000 via the air pipe 950 within the drill casing 106. The down well section 1000 is designed to move the fluid from the section 900 up and down the well to change the chemical, biological, and physical properties of one or more properties of interest in the pile 102.

Figure 8:
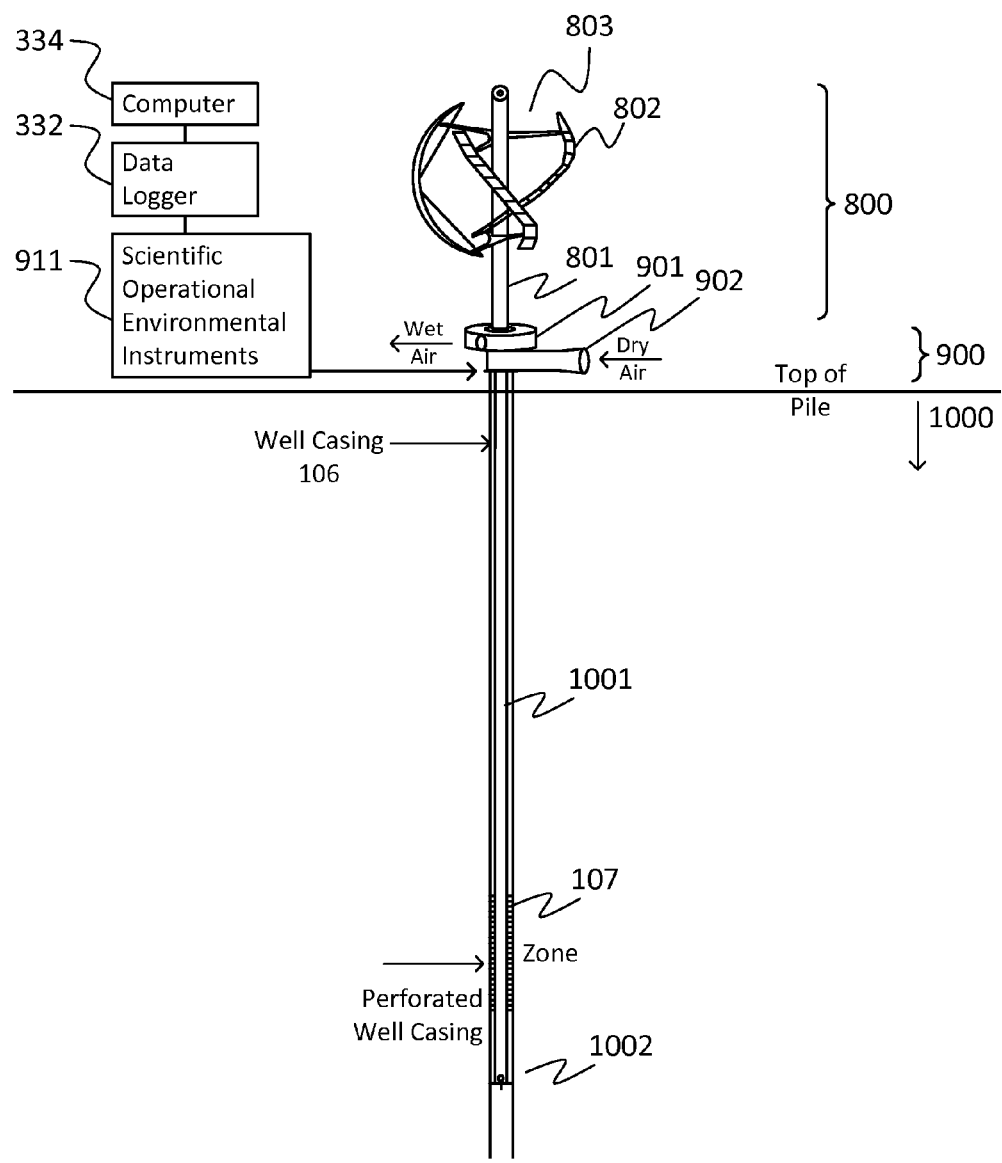
FIG. 8 is an illustration of a system for adding dry surface air via a blower, fan or turbine down a well powered by a wind mill or vertical wind turbine (VWT) and instrumentation for monitoring the operation over time.

FIG. 8 provides additional details regarding the basic green system 700 shown in FIG. 7. The wind mill section 800 includes a wind turbine 803 of some sort and may include solar panels 802, either incorporated into the wind turbine 803 or as a separate structure (not shown). As illustrated in FIG. 8, a vertical wind turbine is shown for collecting the local wind energy and transferring that energy into mechanical energy in a rotating shaft 801, but other types of wind turbines, eductors and aerodynamically designed devices 803 may be used. As one example; the shaft 801 is connected to a fan, blower and/or turbine 901. An aerodynamically designed orifice 902 captures the local solar dried air to be propelled up and down the well section 1000 by the fan, blower and/or turbine 901 or other devices. Systems 900 and 800 are anchored to the well head via standard pipe welding and flange bolting (not shown). The fluids propelled up and down the well are contained by the in place drill pipe/casing 106 and impact the pile through the perforations 107 via optional pipe, hose, ducts, tube, and conduit section 1001, such as a flexible hose. These optional conduits are not required, but incorporated to maximize the performance of the technology. The plug section 1002, is weighted to keep the optional hose 1001 stretched to a desired depth in the well, but is configured to be movable up and down the well to isolate various volumes of the stimulated well for treatment by the propelled fluid from the fan, blower and/or turbine 901 or other devices. Various scientific operational and environmental instruments 911 may be used to measure the performance of the system 700. Measurements may include but are not limited to, local environmental and meteorological measurements, temperature of fluids, humidity, and volume of the fluids collected and propelled in and out, up and down the system.

Figure 9:
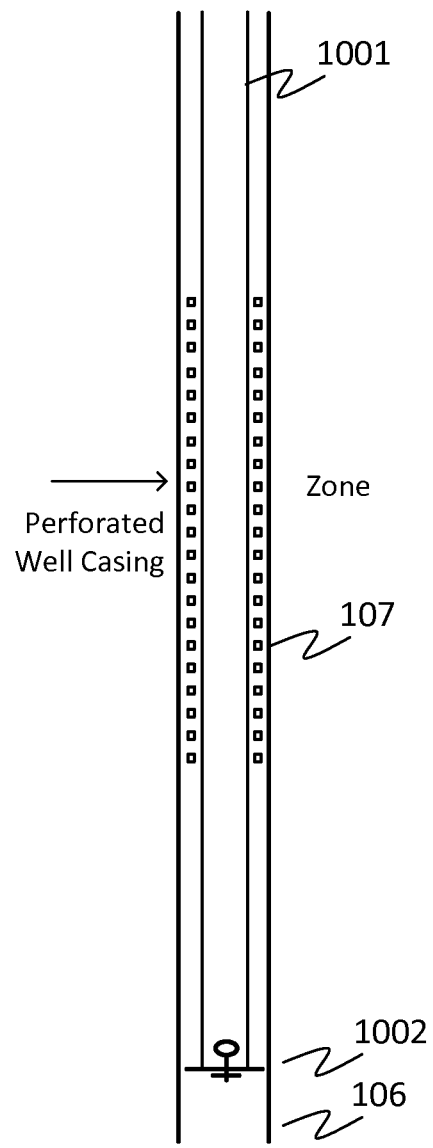
FIG. 9 is an illustration of the vertical round material, (hose, ducts, pipe, tube, cylinder, conduit) attached to the well head to transport a fluid driven by the blower, fan, or turbine to a specific volume, zone or series of zones targeted for treatment.

Further details of the downwell section 1000 are shown with reference to FIG. 9. The well casing 106 is installed in the pile for the above fluid treatments via the perforated sections 107, with the perforated sections 107 positioned and aligned for a desired treatment of the pile. A combination or collection of optional pipes, tubes, hose, ducts, and conduits are then inserted into the well casing 106 to the desired depth, such as hose 101, which may be stretched and supported by the plug 1002. This optional movable plug 1002 may be lowered and raised in the well to selectively treat areas within the pile. The optional plug 1002 may be suspended by a retractable cable, such as cable 522 of FIG. 5.

Figure 10:
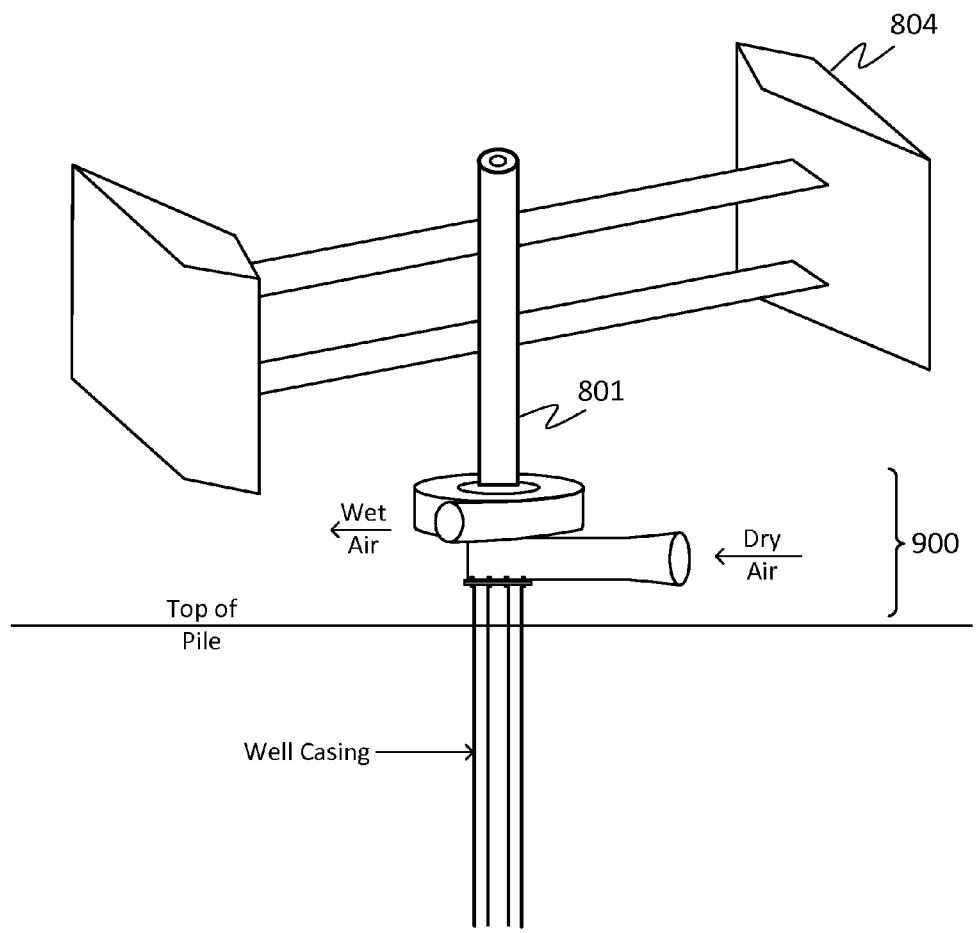
FIG. 10 is an illustration of an embodiment of a VWT attached to a well head with a blower, fan, turbine or combination of the same.
Figure 11:
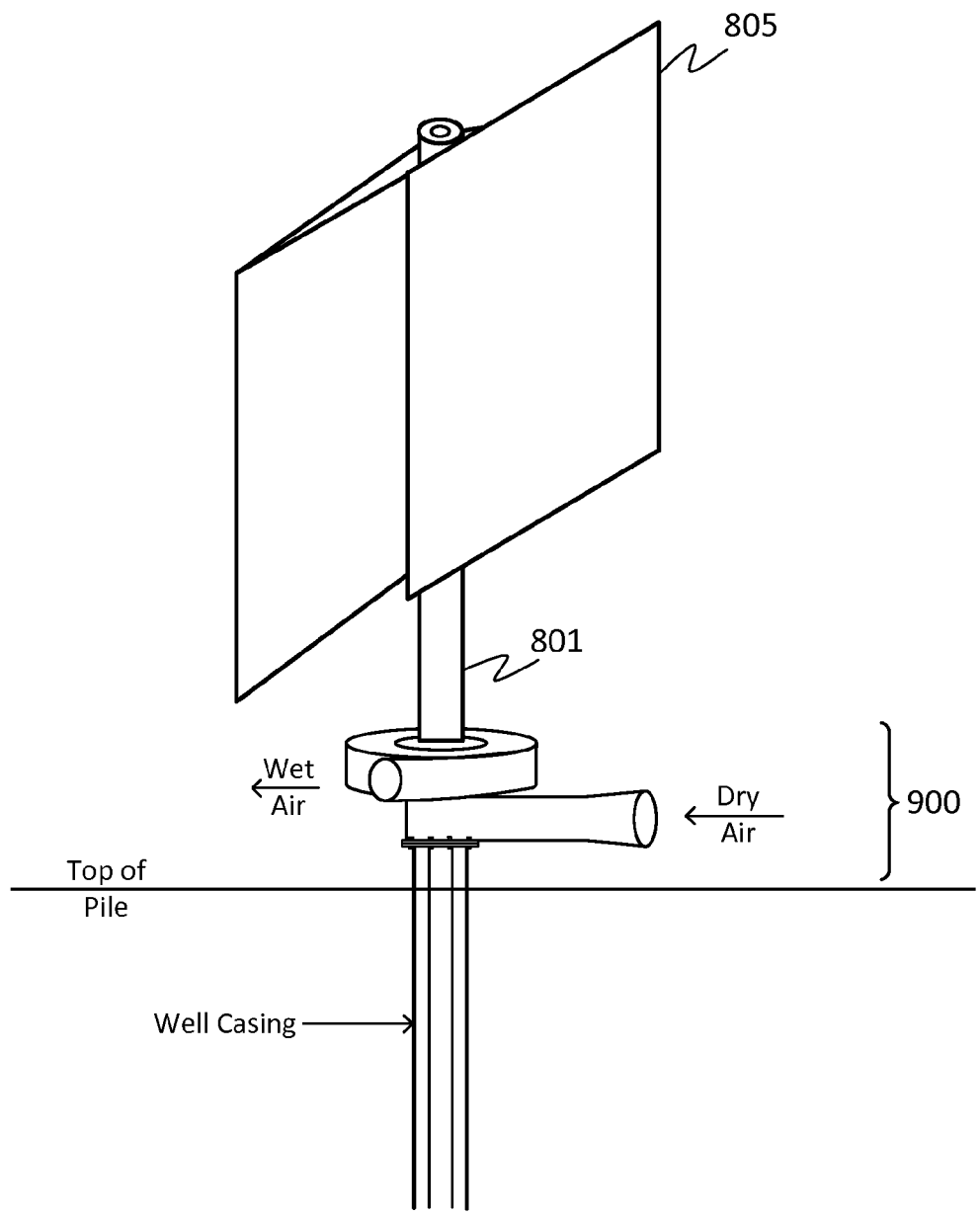
FIG. 11 is an illustration of an embodiment of a VWT attached to a well head with a blower, fan, turbine or combination of the same.

FIGS. 10, 11, 12 and 13 illustrate different embodiments of the wind mill section 800 and the fan, blower, turbine, mechanical gear and bearing section 900. In FIG. 10, the wind mill section 800 uses a different vertical wind turbine design 804 to convert the captured wind energy into mechanical energy to power the blower, fan, and/or turbine in section 900. In FIG. 11, the system uses a different vertical wind turbine design 805 to transport the captured wind energy to mechanical energy that powers the blower, fan, and/or turbine in section 900.

Figure 12:
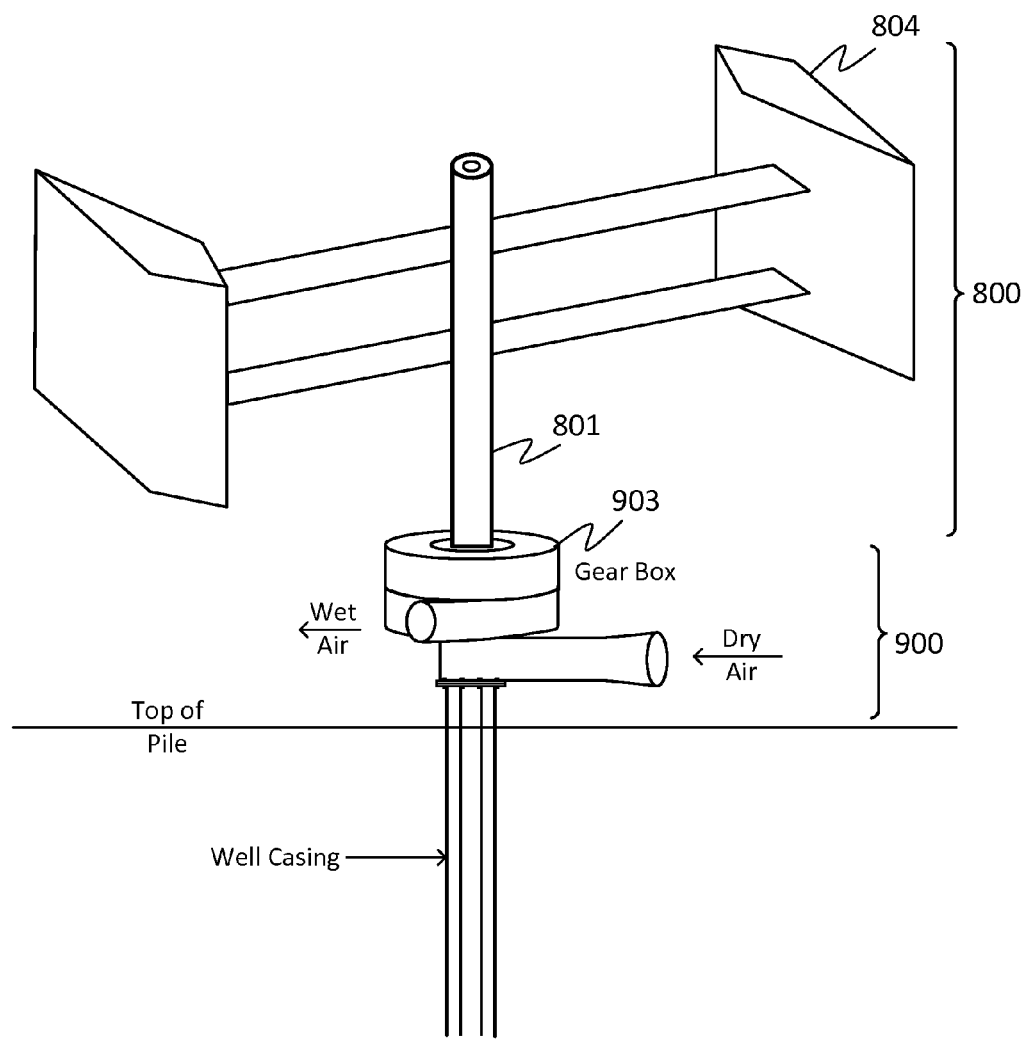
FIG. 12 is an illustration of an embodiment of a VWT attached to a well head with a blower, fan, turbine or combination of the same.

In FIG. 12, section 900 is modified to include a gear box 903. The wind turbine 804 drives the shaft 801, which drives the gear box 903, which converts the angular velocity and momentum of shaft 801 for use by the blower, fan and/or turbine of section 900. The gear box 903 may reduce the maximum angular velocity of the shaft 801 to ovoid over spin and to optimize the revolutions per minute at which the fan, blower, and/or turbine 900 operates. Section 900 draws in dry environmental air for input into the well and expels wet air drawn from within the well as necessary. As performance in the field dictates, a different wind mill and/or VWT design or other devices, with evolved combination blower, fan, turbine, educator, aerodynamic devices, etc., or combinations thereof, may be required to improve the efficiency of the induced fluid flow down the well and reduce maintenance over time.

Figure 13:
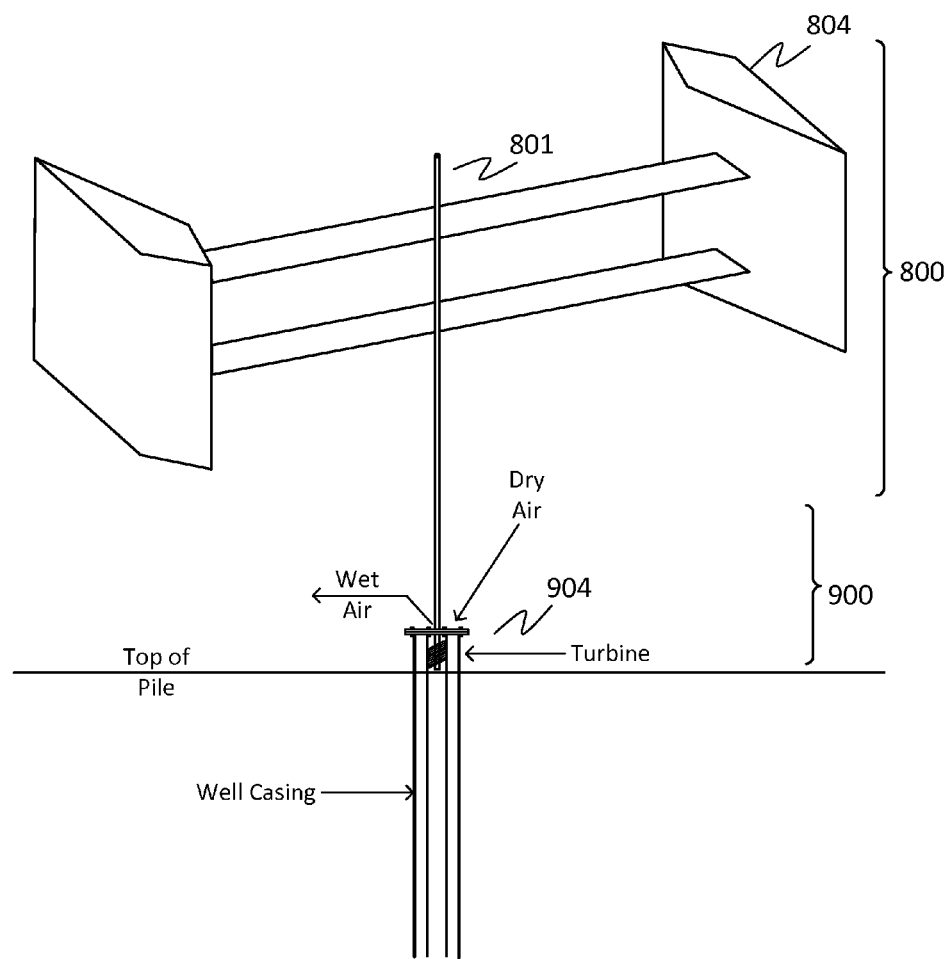
FIG. 13 is an illustration of an embodiment of a VWT attached to a well head with a turbine incorporated to move fluid up and down a well.

Referring to FIG. 13, the system 700 may use a fan, windmill, and/or a vertical wind turbine design 800 to transport the captured wind energy to mechanical energy powering an in-line turbine 904 in section 900. The turbine 904 design will evolve as performance measurements 911 optimize the system.

Figure 14:
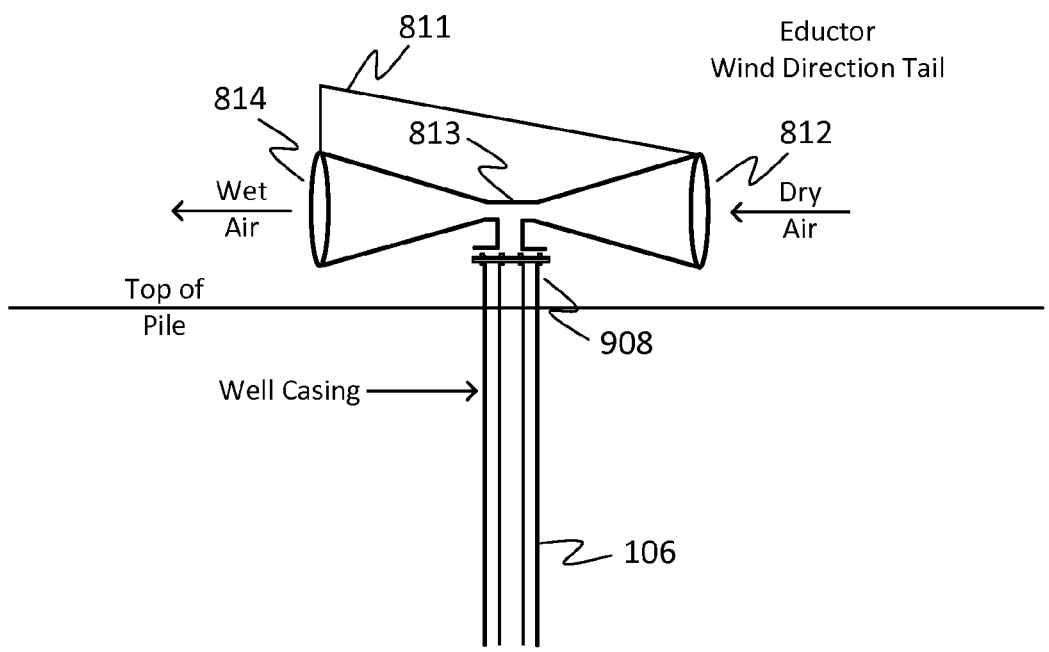
FIG. 14 is an illustration of an embodiment of a tailed wind funnel, injector, ejector, eductor, and/or aspirator to aerodynamically induce fluid flow up and down a well to a specific volume, zone or series of zones targeted for treatment, which may be combined with a blower, fan, or turbine.

As illustrated in FIG. 14, the green system 700 may use a type of a tailed wind funnel, injector, ejector, eductor, and/or aspirator, or other devices or combinations thereof to aerodynamically induce fluid flow up and down a well. The tail 811 may draw local dry air through intake 812 and exhaust fluids from the well via eductor 813 to vent 814. The system 700 may be bolted to the well head by system 908, and bearings may be used to allow rotation of the system 700 so the intake is aligned to the local wind direction. This system 700 may have a minimum of moving parts for maintenance and long term green operation of drying piles.

As previously noted, capturing outside ambient air and forcing that air down into the pile, or pulling air through the pile toward the well casing and up into the well, may serve to dry the impacted zone(s) and remove in situ gases and water vapor. Heaps and piles act like a large sponges and may need to be dried out on occasion as much as they need treatment fluids pumped through them to maximize treatment of the pile. The present embodiments capture otherwise wasted environmental energy in the form of solar and/or wind power to drive a mechanical or aerodynamic device or apparatus that blows or pulls air into or out of the well head in a green manner. Engineering principles dictate that gases and water vapor only diffuse about 2 meters into or out of a heap or pile (depending on particle size, compaction, etc.), unless an outside source of energy is applied. In addition, when it is desirable to prevent any solution from exiting a pile, such as for environmental reasons, using the green system 700 to dry the pile's interior, as properly designed and installed, will server to reduce and or eliminate the solution flowing from a pile over time. Present embodiments will also reduce the need for covers on piles and heaps to reduce the meteoric water quantity.

The descriptions of computing systems described herein are not intended to limit the teachings or applicability of this disclosure. For example, the processing of the various components of the illustrated systems may be distributed across multiple machines, networks, and other computing resources. In addition, two or more components of a system may be combined into fewer components. While some examples of possible connections between systems are shown, any of the components shown herein may communicate with any other subset of components in various implementations.

Depending on the embodiment, certain acts, events, or functions of any of the methods described herein may be performed in a different sequence, may be added, merged, or left out altogether (e.g., not all described acts or events are necessary for the practice of the algorithms). Moreover, in certain embodiments, acts or events may be performed concurrently, e.g., through multi-threaded processing, interrupt processing, or multiple processors or processor cores or on other parallel architectures, rather than sequentially.

The various features and processes described above may be used independently of one another, or may be combined in various ways. All possible combinations and sub-combinations are intended to fall within the scope of this disclosure. In addition, certain method or process blocks or steps may be omitted in some implementations. The methods described herein are also not limited to any particular sequence, and the blocks or steps relating thereto can be performed in other sequences that are appropriate. For example, described blocks or steps may be performed in an order other than that specifically disclosed, or multiple blocks or steps may be combined in a single block or step. The example blocks or steps may be performed in serial, in parallel, or in some other manner. Blocks or steps may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of certain of the disclosures herein.

What is claimed:

1. A method for changing properties of target materials within a pile, comprising:
    installing a drill casing having one or more perforated casing sections into a well installed in the pile;
    inserting a pipe or hose having an opening into the drill casing;
    aligning the opening of the pipe or hose with at last one perforated casing section of the one or more perforated casing sections of the drill casing;
    sealing the drill casing so as to isolate air flowing into the drill casing so that air only flows into the drill casing through the at least one perforated casing section; and
    pulling air through the pipe or hose at a pressure sufficient to remove moisture from the pile when air is pulled from the pile through the at least one perforated casing section and to expel the moisture from the well.

2. The method as recited in claim 1, wherein the opening in the pipe or hose is a perforated section.

3. The method as recited in claim 1, wherein the opening in the pipe or hose is at an open end.

4. The method as recited in claim 1, further comprising:
    pushing air through the at least one perforated casing section at a pressure sufficient to dislodge in situ gas and water vapor in an impacted zone of the pile.

5. The method as recited in claim 4, wherein pulling and pushing occur simultaneously.

6. The method as recited in claim 1, further comprising: generating at the pile power sufficient to enable the pulling.

7. The method as recited in claim 6, the power is generated by a wind mill.

8. The method as recited in claim 6, wherein the power is generated by a solar panel.

9. A method for changing properties of target materials within a pile, comprising:
  installing a drill casing having one or more perforated casing sections into a well installed in the pile, the drill casing being inserted at a depth sufficient to align at last one perforated casing section of the one or more perforated casing sections with an impacted zone of the pile;
  inserting a pipe or hose having an opening into the drill casing;
  aligning the opening of the pipe or hose with the at least one perforated casing section;
  sealing the drill casing so as to isolate air flowing into the drill casing so that air only flows into the drill casing through the at least one perforated casing section; and
  pushing air through the pipe or hose and the at least one perforated casing section at a pressure sufficient to dry the impacted zone and dislodge in situ gas and water vapor in the impacted zone.

10. The method as recited in claim 9, wherein the opening in the pipe or hose is a perforated section.

11. The method as recited in claim 9, wherein the opening in the pipe or hose is at an open end.

12. A system for changing the properties of target materials within a pile, comprising:
  a power section for generating power;
  an air movement section powered by the power section and configured to push air into the pile or pull air through the pile;
  a downwell section configured to be installed into a well installed in the pile, the downwell section including a drill casing having one or more perforated casing sections, a pipe or hose having a perforated section and configured to be inserted into the drill casing and positioned so that the perforated section aligns with at least one of the one or more perforated casing sections, and an isolation mechanism configured to seal the drill casing to isolate the flow of air through the perforated section, wherein the system dries an impacted zone and dislodges in situ gas and water vapor in the impacted zone to improve future fluid treatment of the pile when air is pushed by the air movement section into the downwell section through the perforated section of the pipe or hose and through the perforated casing sections into the pile, and wherein the system removes moisture from the pile when air is pulled from the pile into the downwell section through the perforated section of the pipe or hose and through the perforated casing sections and expelled from the well by the air movement section;
  a manifold configured to transport a fluid for treatment of the impacted zone and to transport and combine the fluid with one or more chemicals to form a treatment fluid; and
  a mobile platform configured to receive the treatment fluid from the manifold, mix the treatment fluid and pump the treatment fluid into a tree section configured to be connected to the mobile platform and connected to a well head of the well,
  wherein the downwell section is connected to the well head and configured so that treatment fluid pumped into the tree section is pumped through the well head and into the pipe or hose, through the perforated section, and through the perforated casing section into the zone so as to lift and mobilize materials within the zone to create a plurality of substantially horizontal channels within the zone through which the treatment fluid flows to change the chemistry of the materials and/or dissolve the target materials for collection from a collection pad.

13. The system as recited in claim 12, wherein the one or more chemicals include reagents transported to the pile.

14. The system as recited in claim 12, wherein the one or more chemicals include one or more solids, liquids, gasses, slurries or combination thereof transported to the pile.

15. The system as recited in claim 14, wherein the mobile platform includes an inline filter for removing the one or more solids from the treatment fluid if the one or more solids exceed a predetermined size.

16. The system as recited in claim 15, wherein the mobile platform includes a pressure gauge and a pressure transducer configured to monitor pressure at the inlet to the inline filter and a purging valve configured to purge and clean the inline filter.

17. The system as recited in claim 15, wherein the mobile platform includes a pressure break and a purging valve configured to purge and clean the inline filter.

18. The system as recited in claim 12, further comprising:
  a compressor configured to produce a volume of compressed air in place of the pump; and
  an inline mixer configured to inject and mix the one or more chemicals into the volume of compressed air for the treatment fluid.

19. The system as recited in claim 12, further comprising a compressor configured to produce a volume of compressed air, wherein the downwell section includes an inflation line configured to receive the compressed air from the compressor and to be inserted into the well from a well head, and wherein the isolation mechanism is configured to receive the compressed air from the inflation line and to seal the drill casing above and below the perforated casing section when inflated by the compressed air.

20. The system of claim 12, wherein the fluid is one or more of solids, a liquid, air and gas.

* * * * *